US009241330B2

(12) United States Patent
Zheng

(10) Patent No.: US 9,241,330 B2
(45) Date of Patent: Jan. 19, 2016

(54) RESOURCE MANAGEMENT METHOD AND APPARATUSES FOR DEVICE TO DEVICE COMMUNICATIONS

(71) Applicant: Industrial Technology Research Institute, Hsinchu (TW)

(72) Inventor: Yan-Xiu Zheng, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 200 days.

(21) Appl. No.: 13/864,222

(22) Filed: Apr. 16, 2013

(65) Prior Publication Data

US 2013/0288645 A1 Oct. 31, 2013

Related U.S. Application Data

(60) Provisional application No. 61/639,059, filed on Apr. 26, 2012, provisional application No. 61/639,107, filed on Apr. 27, 2012.

(51) Int. Cl.
*H04M 1/66* (2006.01)
*H04W 36/00* (2009.01)
*H04W 72/04* (2009.01)
*H04W 76/02* (2009.01)

(52) U.S. Cl.
CPC .......... *H04W 72/0446* (2013.01); *H04W 72/04* (2013.01); *H04W 76/023* (2013.01)

(58) Field of Classification Search
None
See application file for complete search history.

(56) References Cited

U.S. PATENT DOCUMENTS

| 5,633,913 | A | 5/1997 | Talarmo |
| 5,794,151 | A | 8/1998 | McDonald et al. |
| 6,714,789 | B1 | 3/2004 | Oh et al. |
| 6,788,809 | B1 | 9/2004 | Grzeszczuk et al. |
| 7,218,936 | B2 | 5/2007 | Rinne et al. |
| 7,359,715 | B2 | 4/2008 | Choksi |
| 7,363,043 | B2 | 4/2008 | Jaeckle et al. |

(Continued)

FOREIGN PATENT DOCUMENTS

| CN | 101689936 | 3/2010 |
| CN | 102090132 | 6/2011 |

(Continued)

OTHER PUBLICATIONS

"Office Action of Taiwan Counterpart Application", issued on Jan. 13, 2015, p. 1-p. 10, in which the listed references were cited.

(Continued)

*Primary Examiner* — Erika A Washington
(74) *Attorney, Agent, or Firm* — Jianq Chyun IP Office

(57) ABSTRACT

The present disclosure proposes a method and apparatuses for geographical zone based radio resource management. The geographical zone based radio resource management method adapted for a control node would receive from a user equipment a request to communicate in a Device to Device (D2D) mode of communication. The control node would validate the user equipment according to a geographical zone in which the user equipment is located in response to the request of the user equipment to communicate in the D2D mode, wherein the geographical zone is formed by at least three control nodes. The control node would then notify the user equipment whether the user equipment may communicate in the D2D mode after the user equipment is authorized.

45 Claims, 20 Drawing Sheets

(56) References Cited

U.S. PATENT DOCUMENTS

| | | |
|---|---|---|
| 7,554,942 B2 | 6/2009 | Joong et al. |
| 7,606,938 B2 | 10/2009 | Roese et al. |
| 7,693,527 B2 | 4/2010 | Krstulich |
| 7,958,041 B2 | 6/2011 | Stanforth et al. |
| 8,139,496 B2 | 3/2012 | Stanforth et al. |
| 8,150,422 B2 | 4/2012 | Eldering |
| 8,234,208 B2 | 7/2012 | Stanforth et al. |
| 8,238,921 B2 | 8/2012 | Chang et al. |
| 2005/0197118 A1 | 9/2005 | Mitchell |
| 2005/0260973 A1 | 11/2005 | van de Groenendaal |
| 2005/0288036 A1 | 12/2005 | Brewer et al. |
| 2007/0287469 A1 | 12/2007 | Wijting et al. |
| 2008/0026767 A1 | 1/2008 | Krstulich |
| 2008/0182592 A1 | 7/2008 | Cha et al. |
| 2008/0183714 A1 | 7/2008 | Nakhjiri |
| 2008/0221951 A1 | 9/2008 | Stanforth et al. |
| 2009/0017855 A1 | 1/2009 | Kwon et al. |
| 2009/0100260 A1 | 4/2009 | Govindarajan |
| 2009/0132163 A1 | 5/2009 | Ashley et al. |
| 2009/0137255 A1 | 5/2009 | Ashley et al. |
| 2009/0138336 A1 | 5/2009 | Ashley et al. |
| 2009/0206157 A1 | 8/2009 | Heffez et al. |
| 2010/0087166 A1 | 4/2010 | Agashe |
| 2010/0094500 A1 | 4/2010 | Jin |
| 2010/0120398 A1 | 5/2010 | Chang et al. |
| 2010/0165882 A1 | 7/2010 | Palanki et al. |
| 2010/0165947 A1 | 7/2010 | Taniuchi et al. |
| 2010/0167742 A1* | 7/2010 | Rajagopalan et al. ........ 455/436 |
| 2010/0173586 A1 | 7/2010 | McHenry et al. |
| 2010/0210286 A1 | 8/2010 | Dufva et al. |
| 2010/0234062 A1 | 9/2010 | Ito et al. |
| 2010/0246468 A1 | 9/2010 | Santhanam et al. |
| 2010/0248742 A1 | 9/2010 | Song et al. |
| 2010/0255858 A1 | 10/2010 | Juhasz |
| 2010/0279647 A1 | 11/2010 | Jacobs et al. |
| 2010/0309806 A1 | 12/2010 | Wu et al. |
| 2011/0059748 A1 | 3/2011 | Taylor et al. |
| 2011/0258327 A1 | 10/2011 | Phan et al. |
| 2011/0300892 A1 | 12/2011 | Hakola et al. |
| 2011/0317569 A1 | 12/2011 | Kneckt et al. |
| 2012/0014382 A1 | 1/2012 | Lazzaro et al. |
| 2012/0202495 A1 | 8/2012 | Gehlen et al. |

FOREIGN PATENT DOCUMENTS

| | | |
|---|---|---|
| WO | 2011109941 | 9/2011 |
| WO | 2012035367 | 3/2012 |

OTHER PUBLICATIONS

Mayher et al., The Sum Data Base: A New Measure of Spectrum Use, Aug. 1988, p. 1-p. 132, U.S. Department of Commerce.

Deaton et al., "The Effects of a Dynamic Spectrum Access Overlay in LTE-Advanced Networks",2011 IEEE Symposium on New Frontiers in Dynamic Spectrum Access Networks (DySPAN), May 2011, p. 488-p. 497.

Lu et al., "Ten years of research in spectrum sensing and sharing in cognitive radio", EURASIP Journal on Wireless Communications and Networking, Jan. 2012, vol. 2012, p. 1-p. 16.

Axell, et al., "Linköping University Post Print: Capacity considerations for uncoordinated communication in geographical spectrum holes", Physical Communication, Jun. 2009, vol. 2, p. 1-p. 17.

Nasreddine et al., "A Primary Spectrum Management Solution Facilitating Secondary Usage Exploitation", ICT-Mobile Summit, Jun. 2008, p. 1-p. 8.

Radio Spectrum Policy Group 2011, Report on Collective Use of Spectrum (CUS) and other spectrum sharing approaches, Nov. 2011, p. 1-p. 38.

Axell, et al., "Capacity considerations for uncoordinated communication in geographical spectrum holes", Physical Communication, Mar. 2009, vol. 2, p. 3-p. 9.

"Office Action of Taiwan Counterpart Application", issued on Mar. 25, 2015, p. 1-p. 20, in which the listed references were cited.

"Office Action of China Counterpart Application", issued on Sep. 29, 2015, p. 1-p. 6, in which the listed references were cited.

* cited by examiner

|  | UE 911 | UE 912 | UE 913 |
|---|---|---|---|
| UE 911 | X | yes | Yes |
| UE 912 | Yes | X | No |
| UE 913 | Yes | No | X |

RESOURCE MANAGEMENT METHOD AND APPARATUSES FOR DEVICE TO DEVICE COMMUNICATIONS

CROSS REFERENCE TO RELATED APPLICATION

This application claims the priority benefits of U.S. provisional application Ser. No. 61/639,059, filed on Apr. 26, 2012 and U.S. provisional application Ser. No. 61/639,107, filed on Apr. 27, 2012. The entirety of each of the above-mentioned patent applications is hereby incorporated by reference herein and made a part of specification.

TECHNICAL FIELD

The present disclosure proposes a resource management method for device to device communications and apparatuses using the same.

BACKGROUND

Device to Device (D2D) communications is a technology which allows UEs (User Equipment) to directly communicate among each other without having an eNB's (enhanced NodeB or eNodeB) to constantly forwarding data in between. A traditional cellular communications system such as the LTE system would typically only allow signaling to be exchanged between UE and base station while direct exchanges among UEs themselves are not yet defined, and therefore, D2D communications at this point in time is not yet feasible in an LTE communications system. Currently, even though UEs in an LTE system could be situated right next to each other, the UEs would still be required to go through the network entry procedure through a base station, which would forward each and every data sent by one UE to another UE. Therefore, various schemes for direct communications among UEs are currently being proposed.

There are various D2D communications schemes but D2D resource management schemes would be required on a licensed band. If a user operates on an unlicensed band, the user could communicate with each other without authorization by using meanings such, for example: WiFi, Bluetooth. However, if a user communicates on a licensed band, the user would require an authorization from the spectrum owner to communicate with other users directly. Therefore, a D2D radio resource management scheme would be required to effectively perform network management functions such as resource leasing, charging, priority management, and so forth. Therefore, in the present disclosure, a method and apparatuses would be proposed to perform D2D radio resource management.

SUMMARY OF THE DISCLOSURE

The present disclosure proposes a method for device to device communications and apparatuses using the same. More particularly, the present disclosure proposes a method and apparatuses for geographical zone based radio resource management.

The present disclosure proposes a resource management method for device to device (D2D) communications in a network, adapted for a control node, and the method includes the steps of: receiving from a first device a request to communicate in a D2D mode, validating the first device according to a geographical zone in which the first device is located in response to the request to communicate in the D2D mode, wherein the geographical zone is formed by at least three control nodes, and notifying the first device whether the first device may communicate in the D2D mode in response to validating the first device.

The present disclosure proposes a resource management method for device to device (D2D) communications in a network, adapted for a user equipment, and the method includes the steps of: transmitting to a first target a request to communicate in a D2D mode, performing a validation with the first target according to a geographical zone in which the user equipment is located in response to the request to communicate in the D2D mode, wherein the geographical zone is formed by at least three control nodes, and receiving a notification from the first target whether the user equipment may communicate in the D2D mode in response to performing the validation with the first target.

In order to make the aforementioned features of the present disclosure comprehensible, exemplary embodiments accompanied with figures are described in detail below. It is to be understood that both the foregoing general description and the following detailed description are exemplary, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

In this disclosure, 3GPP-like keywords or phrases are used merely as examples to present inventive concepts in accordance with the present disclosure; however, the same concept presented in the disclosure can be applied to any other systems such as IEEE 802.11, IEEE 802.16, WiMAX, and so like by persons of ordinarily skilled in the art.

While a UE can be configured to directly communicate with another UE, a UE communicating over a licensed band would require authorization from the spectrum owner of the license band in order to communicate with other UEs directly. Therefore, UEs communicating in a D2D mode would still need to attach to a network which belongs to the spectrum owner of the license band in order to acquire the proper authorization and to obtain radio resources. Thus, a resource management method and apparatuses operating within a network are proposed to implement resource leasing, charging, and priority management. The proposed method would first include a way to perform an access authorization so that a user could obtain the permission to communicate with other users directly on a licensed spectrum. After the user has been authorized, the proposed method would allocate D2D resources. The proposed method would also include a way to enhance resource management by maintaining a network topology so that D2D communications may even extend beyond the coverage of a base station.

Figure 1A:
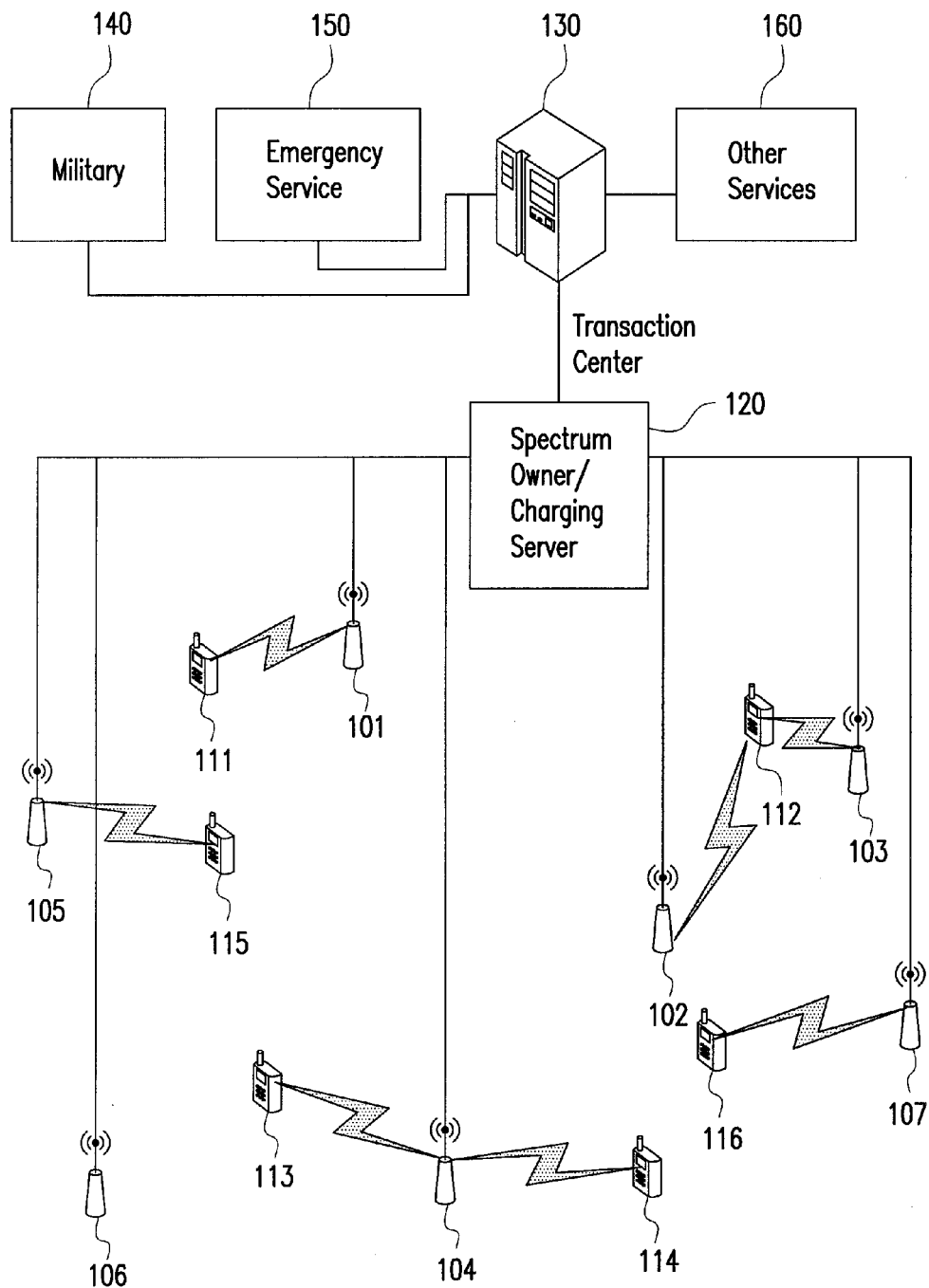
FIG. 1A illustrates system architecture for D2D communications in accordance with one of the exemplary embodiments of the present disclosure.

FIG. 1A illustrates an overall architecture for managing D2D communications in accordance with one of the exemplary embodiments of the present disclosure. In the proposed system architecture, one or more UEs could be attached to the network through one or more control nodes to obtain authorization and radio resources. For instance, UEs (111~116) could be attached to the network through control nodes (101~107). More specifically, a single UE 111 could be attached to the network through a control node 101, multiple UEs such as 113 and 114 could be attached to the network through a control node 104, or a single UE 112 could be attached to the network through multiple control nodes such as 102 and 103.

A control node in this disclosure would be referred to as a base station (BS) or an eNB. It should be noted that the references of such are merely exemplary and therefore do not serve as limitations to the type of control nodes as it would be apparent to those skilled in the art that other types of control node could be selected to achieve network control purposes such as an advanced base station (ABS), a base transceiver system (BTS), an access point, a home base station, a relay station, a scatterer, a repeater, an intermediate node, an intermediary, and/or satellite-based communications base stations. A control node may include entities such as a Mobility Management Entity (MME), a Serving Gateway (S-GW), a Packet Data Network Gateway (PDN-GW), a Serving GPRS Support Node (SGSN), a Gateway GPRS Support Node (GGSN), a Mobile Switching Center (MSC), and a Home Subscriber Server (HSS) or a node maintaining a database related to subscriber information.

Figure 1B:
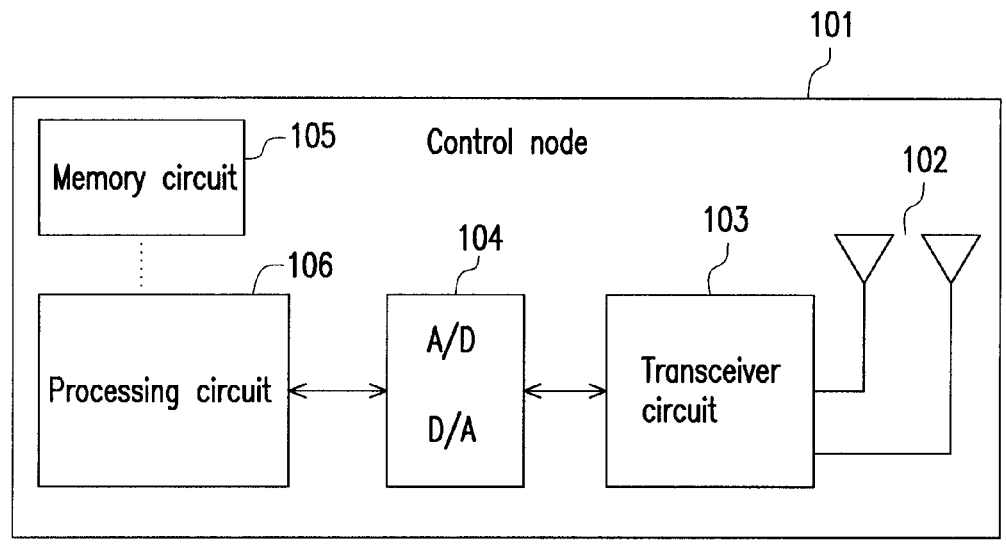
FIG. 1B illustrates a UE in accordance with one of the exemplary embodiments of the present disclosure.

A control node may be represented by at least the functional elements as illustrated in FIG. 1B in accordance with an exemplary embodiment of the present disclosure. Each control node 101 may contain at least but not limited to a transceiver circuit 103, an analog-to-digital (A/D)/digital-to-analog (D/A) converter 104, a processing circuit 106, optionally a memory circuit 105, and one or more antenna units 102. The transceiver circuit 103 transmits downlink signals and receives uplink signals wirelessly. The transceiver circuit 103 may also perform operations such as low noise amplifying, impedance matching, frequency mixing, up or down frequency conversion, filtering, amplifying, and so like. The analog-to-digital (A/D)/digital-to-analog (D/A) converter 104 is configured to convert from an analog signal format to a digital signal format during uplink signal processing and from a digital signal format to an analog signal format during downlink signal processing.

The processing circuit 106 is configured to process digital signal and to perform procedures of the proposed method for bit adaptive precoding matrix indicator feedback mechanism in accordance with exemplary embodiments of the present disclosure. Also, the processing circuit 106 may optionally be coupled to a memory circuit 105 to store programming codes, device configurations, a codebook, buffered or permanent data, and etc. . . . The functions of the processing circuit 106 may be implemented using programmable units such as a micro-processor, a micro-controller, a DSP chips, FPGA, etc. The functions of the processing circuit 106 may also be implemented with separate electronic devices or ICs, and the processing circuit may also be implemented with either hardware or software.

The term "user equipment" (UE) in this disclosure could represent various embodiments which for example could include but not limited to a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so forth.

Figure 1C:
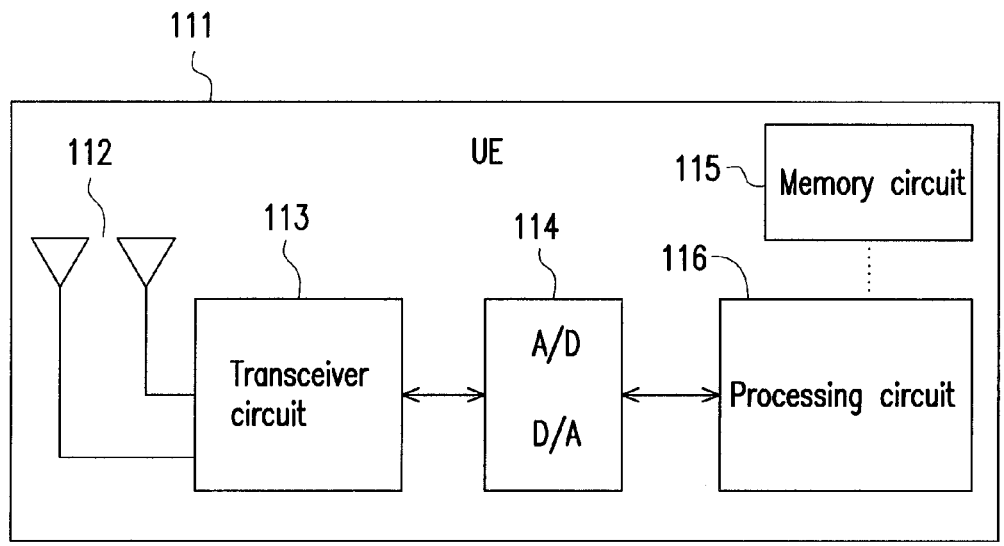
FIG. 1C illustrates a control node in accordance with one of the exemplary embodiments of the present disclosure.

A UE may be represented by at least the functional elements as illustrated in FIG. 1C in accordance with an exemplary embodiment of the present disclosure. Each UE 111 of the communications system may contain at least but not limited to a transceiver circuit 113, an analog-to-digital (A/D)/digital-to-analog (D/A) converter 114, a processing circuit 116, optionally a memory circuit 115, and one or more antenna units 112. The memory circuit 115 may store programming codes, device configurations, buffered or permanent data, codebooks, and etc. The processing circuit 116 may also be implemented with either hardware or software. The function of each element of a UE 111 is similar to a control node 101 and therefore detailed descriptions for each element will not be repeated.

Referring back to FIG. 1A, the control nodes (101~107) of FIG. 1A may communicate with spectrum owner/charging center server 120 which performs the function of spectrum leasing and charging. The spectrum owner/charging center server 120 may communicate and negotiate with a transaction center 130 through which service providers (e.g. the military 140, emergency service 150, and other services 160) external to the network may obtain permissions from the spectrum owner/charging server 120 to authorize D2D UEs belonging to the service providers for access. An example of a charging center server 120 in the case for the LTE could be the Policy and Charging Rules Function (PCRF) node which is responsible for quality-of-service (QoS) handling and charging, and the PCRF node is coupled to a Home Subscriber Service (HSS) node from which a database containing subscriber information could be obtained. The detailed operating principle would be as follows.

Figure 2A:
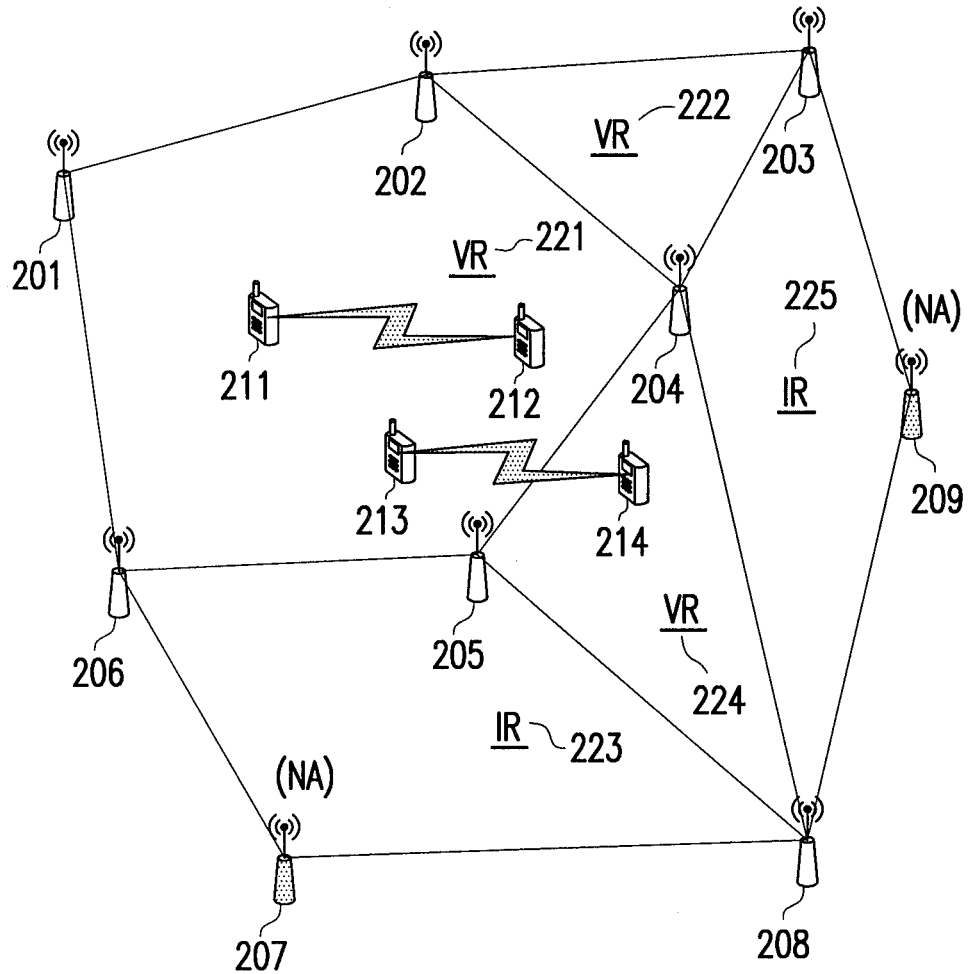
FIG. 2A illustrates a geographical zone based radio resource management method in accordance with one of the exemplary embodiments of the present disclosure.

Before a UE could engage in a D2D communications with another UE, the UE would first need to obtain authorization from the spectrum owner/charging server through a control node. One way of implementing the device authorization for D2D communications could be to adopt a geographical zone based radio resource management method. FIG. 2A illustrates the geographical zone based radio resource management method in accordance with one of the exemplary embodiments of the present disclosure. In this proposed geographical zone based radio resource management method, multiple geographical zones are defined by a plurality of control nodes. A geographical zone is defined as a territory carved out by at least three control nodes as logically it would take at least three vertices, or three points, to form a non-zero two dimensional area. The plurality of the at least three control nodes together would further determine whether a geographical zone defined by the at least three control nodes is a valid D2D zone or is an invalid D2D zone. Within a valid D2D zone, UEs may engage in D2D communications with other UEs, and the UEs may also engage in D2D communications with other UE across different valid geographical zones. For more specific detail, please refer to the following example.

In the exemplary scenario of FIG. 2A, multiple geographic zones 221~225 are defined by a plurality of control nodes 201~209. Within the multiple geographical zones, there could be valid regions (VR) 221 222 224 and invalid regions (IR) 223 225. In general, a valid region is a region which may allow a device to communicate with at least one other device directly. In an invalid region, a device may not communicate with another device directly but may only communicate through a control node or coordinator. In each of the control node defined geographic zones 221~225, the control nodes which define each region determines whether the region is valid or invalid according to a rule. Control nodes 201~209 would indicate whether any one of the control nodes 201~209 would allow or not allow the D2D communication.

According to one exemplary embodiment, if all control nodes which forms a region indicate that they would each individually allow the D2D communication, then the region is considered a valid region. For example, the region 221 is a valid region 221 because the region is defined by control nodes 201, 202, 204, 205, and 206, and all of the control nodes 201, 202, 204, 205, and 206 indicate that they would allow the D2D communication. On the contrary, a region is considered an invalid D2D region if any one of the control nodes which together define the region indicates that it would not allow the D2D communication. For example, the region 223 is an invalid region 223 because the control node 207 indicates that it would not allow the D2D communications even though other control nodes 205, 206, and 208 indicate that they would allow the D2D communication.

A similar principle applies for the valid region 222 and the valid region 224. In the valid region 222, all control nodes 202~204 which define the region 222 indicate that they would allow the D2D communication. Also in the valid region 224, all control nodes 204, 205, and 208 which define the region 224 indicate that they would allow the D2D communication. However, the region 225 is an invalid region 225 because the control node 209 indicates that it would not allow the D2D communications even though other control nodes 203 204 and 208 which define the region indicate that they would allow the D2D communication.

According to another exemplary embodiment, a valid region could be defined by having less than all of the control nodes indicating that they would allow the D2D communications in the region in which all of the control nodes would together define. An invalid region could be defined by having two or more control nodes indicating that they would not allow the D2D communications in the region in which all of the control nodes would together define.

A region could be calculated by the coordinates of the coordinators which together define the region. For instance, in the valid region 224, the region could be defined according to the geographical coordinate such as the latitude and the longitude of each of the control nodes or coordinators 204 205 and 208. After obtaining the geographical coordinate of each of the control nodes 204 205 and 208, whether a device is in the region or out of the region could easily be calculated by the device itself or by any of the control node or by the spectrum owner/charging server 120.

A valid region could be extended based on the range of the radio coverage of each of the control nodes or coordinators. For instance, if a device is adequately under the RF range of an allowed coordinator outside a boundary of a valid region, the device could still be considered to be situated in the valid region, and thus the device could communicate with other devices in the valid region or across the valid region to another valid region.

Figure 2B:
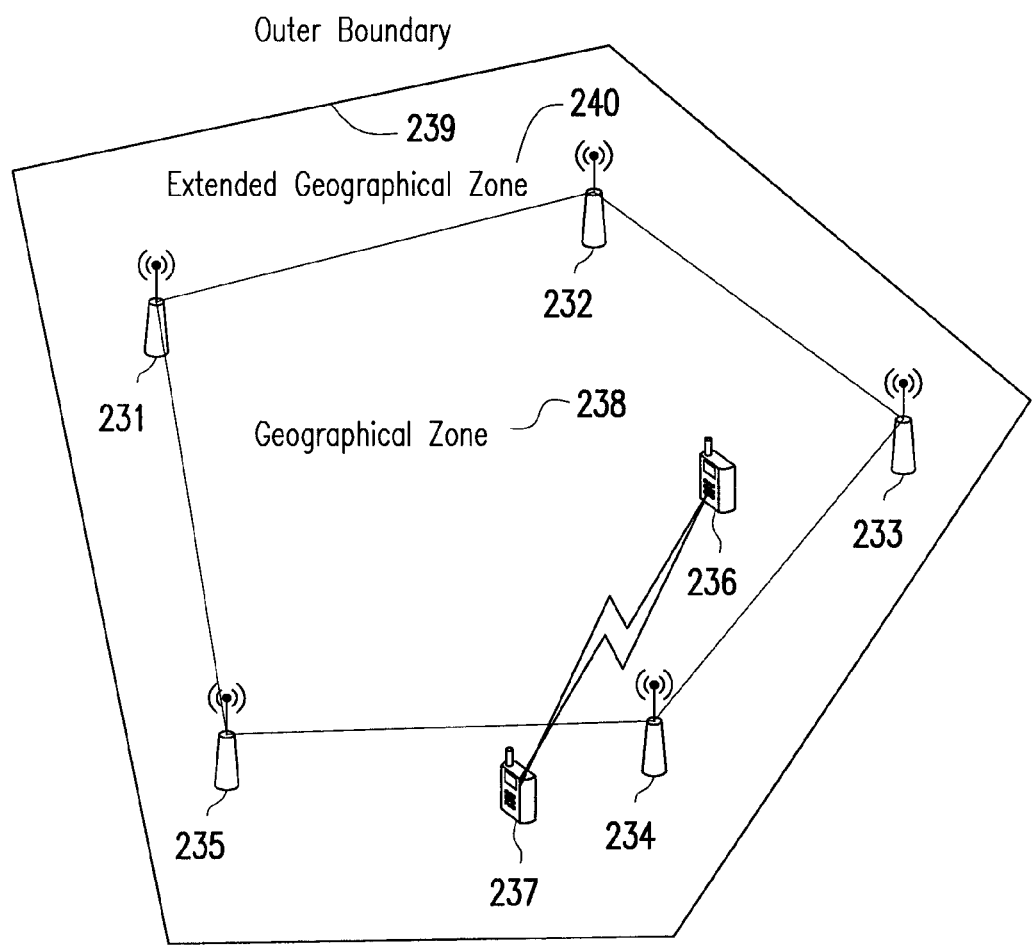
FIG. 2B illustrates an extended geographical zone based radio resource management method in accordance with one of the exemplary embodiments of the present disclosure.

FIG. 2B illustrates an extended geographical zone based radio resource management method in accordance with one of the exemplary embodiments of the present disclosure. In the exemplary embodiment of FIG. 2B, a group of control nodes 231~235 or coordinators define a geographical zone 238. Suppose that the boundary 239 is the maximum extend of which the radio coverage of the group of control nodes 231~235 could provide. Between the boundary 239 and the geographical zone 238 lies the extended geographical zone 240 which is considered an extension of the geographical zone 238 and thus for all practical purpose would be considered the same region as the geographical zone 238. The implication is that a UE 236 in the geographical zone 238 could communicate with another UE 237 in the extended geographical zone 240 since the UE 236 is in the geographical zone 238 and UE 237 is in the coverage of control node 234. Also, the status of validity or invalidity would also be consistent between the geographical zone 238 and the extended geographical zone 240.

Figure 2C:
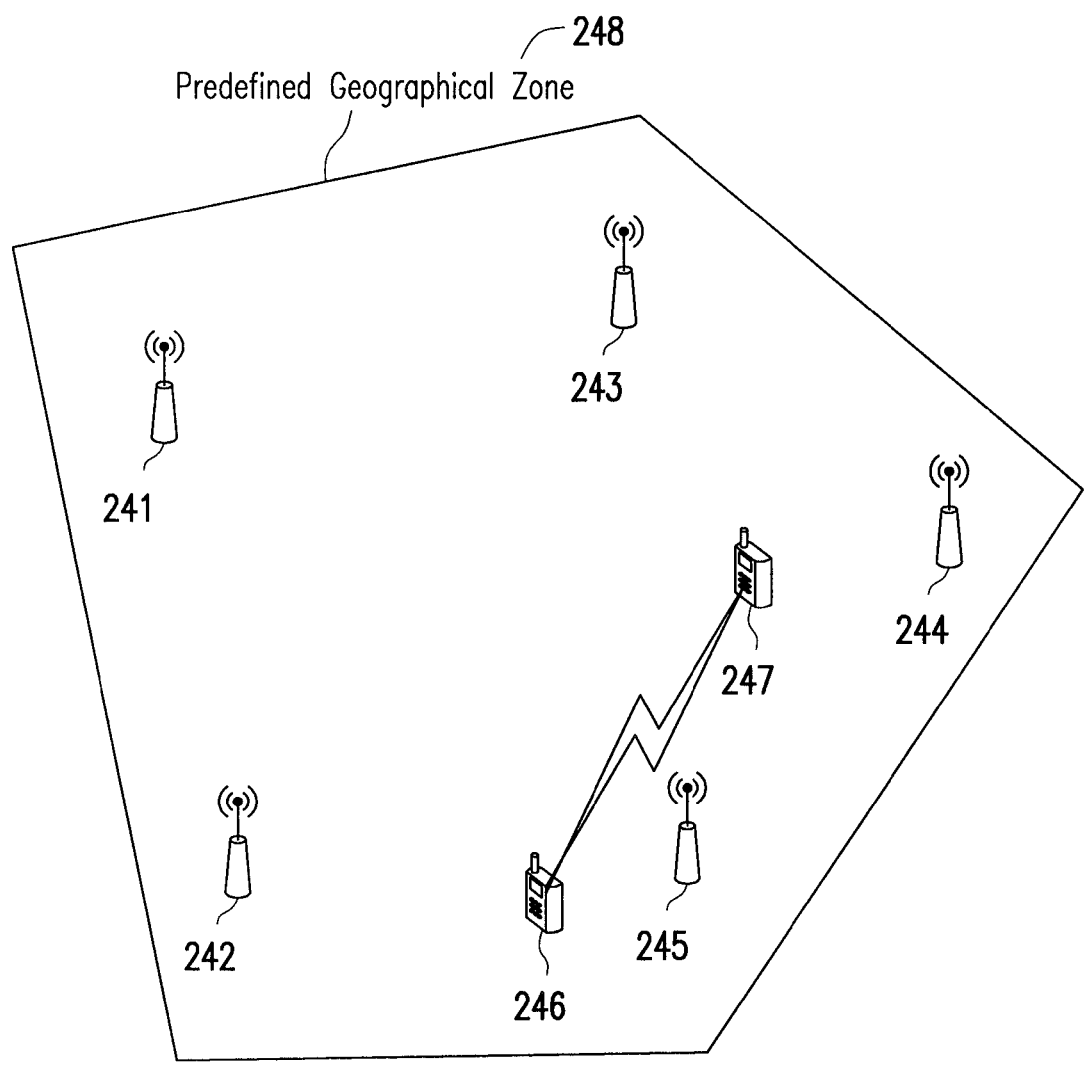
FIG. 2C illustrates a predefined geographical zone based radio resource management method in accordance with one of the exemplary embodiments of the present disclosure.

FIG. 2C illustrates a predefined geographical zone based radio resource management method in accordance with one of the exemplary embodiments of the present disclosure. For the exemplary embodiment of FIG. 2C, a predefined geographical zone 248 is defined according to the absolute geographical coordinates (e.g. longitude & latitude) of the zones. Within the territory carved out by the predefined geographical zone 248, any area within the territory would be considered the same zone regardless of the location in which the control nodes 241~245 are situated. A UE 246 would be able to communicate directly with another UE 247 if the zone is determined by the group of control nodes 241~245 as valid.

The geographical zone could be predefined for a group of D2D devices which subscribe a service to be allowed communicating on the predefined area. FIG. 3 illustrates an example. The D2D device could calculate its position to check if the device in pre-defined geographical zone. If the D2D device is in the pre-defined geographical zone, the D2D device could perform direct communications.

Based on the aforementioned geographical zone defined by a combined group of coordinating control nodes, UEs first be validated by a network according to their geographical zones before they could engage in D2D communications. The present disclosure proposes three approaches for a D2D device to validate whether it is in an allowed graphical zone.

The first approach is a D2D device calculation approach. For this approach, A D2D device would first acquire locations of control nodes which define the current geographical zone in which the D2D device is located. Based on the locations of these control nodes, the D2D device would calculate if it is located in a valid region according to the geographical coordinates of these coordinators.

The second approach is a D2D device reporting approach. For this approach, a D2D device would report its current location to a control node. The control node would then verify if the D2D device belongs to a valid region. If the D2D device belongs to the valid region, the device would be informed by the network that it is allowed for the D2D communication.

The third approach is a network positioning approach. For this approach, a D2D device would send a pilot signal to one or more control nodes nearby. The control nodes nearby would estimate the timing of the arrival of the pilot signal to estimate the distances between the one or more control nodes and the D2D device. The control nodes could then calculate the location of this D2D device based on the estimated distance. If the location of the D2D device is found to belong to a valid region, then D2D device would be informed by the network that it is allowed for the D2D communication.

After a D2D device is validate for D2D communication, the network would then implement resource leasing and charging. The present disclosure proposes two approaches. The first approach is a D2D device oriented approach; and the second approach is a service provider oriented approach. Referring back to FIG. 1A, for the first approach, UEs 111~116 (i.e. at least any one of them) would first access a control node to request for the radio resources. Assuming that the UEs 111~116 is found to be in a valid geographical region, the control node would then request from a spectrum owner/charging server 120 for its permission to access the network. The spectrum owner/charging server 120 would then determine whether it would allow the UEs 111~116 for the D2D communication. Furthermore, the spectrum owner/charging server 120 may send requests to other entities or services (e.g. military 140, emergency service 150, and other services 160) through a transaction center 130 to negotiate whether the UEs 111~116 belongs to a subscribed service of these entities or services. If the UEs 111~116 belongs to a subscribed service, then the UEs 111~116 may communicate with other D2D UEs 111~116.

The second approach is a service provider oriented approach. For this approach, UEs 111~116 may request for permission and resource to engage in D2D communications through a service provider (e.g. military 140, emergency service 150, and other services 160). The service provide may request the D2D communications service through the spectrum owner/charging server 120 by negotiating with the spectrum owner/charging server 120 through the transaction center 130. The spectrum owner/charging center 130 would determine whether the UEs 111~116 subscribed to the service provider (e.g. 140, 150, 160) and would authorize UEs 111~116 belonging to the service provider to communicate through the spectrum which belongs to the spectrum owner 120. UEs 111~116 may access a control node 101~107 to request for radio resources. The control node 101~107 would then request from the spectrum owner/charging server 120 for the permission to communicate in D2D mode. The spectrum owner would then authorize the spectrum usage for the UEs 111~116 which has subscribed to a server.

As far as charging is concerned, a UE which is authorized to communicate directly with another UE in the D2D mode could be charged and given radio resources according to the amount of time and/or frequency usage. A UE may also be charged according to priority or the number of available contention slots.

Figure 3A:
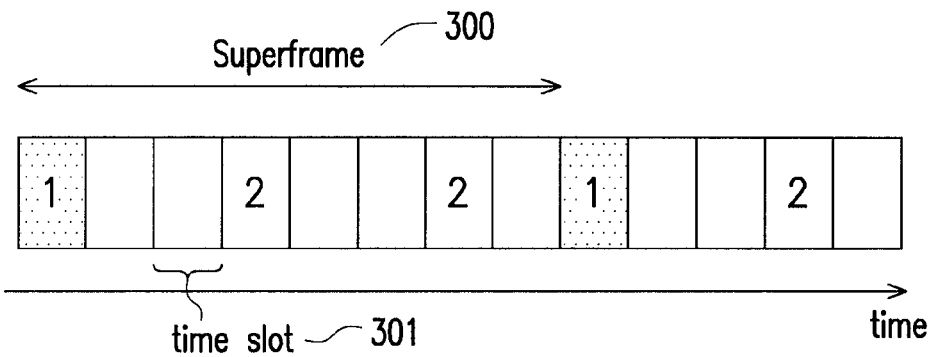
FIG. 3A illustrates a resource allocation method based on time slots in accordance with one of the exemplary embodiments of the present disclosure.

For an exemplary embodiment, the present disclosure proposes that the resource allocation could be based on time slots. For the time slots based resource allocation, a frame structure may be partitioned into multiple time slots (The time slot 301 is one of such time slots). Charging and resource allocation could be based on allocated time slots. FIG. 3A illustrates a resource allocation method based on time slots in accordance with one of the exemplary embodiments of the present disclosure. For the exemplary embodiment, it is supposed that a super frame 300 is composed of a total of 8 slots. Also, it is supposed that the slot marked by "1" occurs once every superframe. The slot marked by "2" occurs twice every superframe. The slots marked by 1 or 2 could either repeat in a fixed pattern for every superframe, or the pattern could vary among different superframes. Therefore, if a user pays more, the user could transmit on the slots marked by 2. If a user pays less, the user could transmit on the slot marked by 1.

Figure 3B:
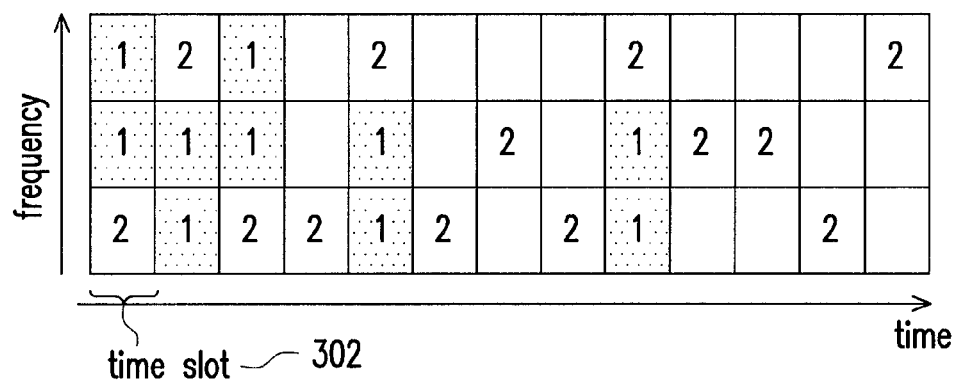
FIG. 3B illustrates a resource allocation method based on transmission bandwidth in accordance with one of the exemplary embodiments of the present disclosure.

For an exemplary embodiment, the amount of transmission bandwidth could be allocated according to the price for which a user is willing to pay. The higher the price a user is willing to pay, the larger bandwidth could be allocated. FIG. 3B illustrates a resource allocation method based on transmission bandwidth in accordance with one of the exemplary embodiments of the present disclosure. Supposedly that a time slot 302 could be divided into at least three slots. The block marked by 1 per time slot could occur twice every time slot, and the block marked 2 would occur at most once every time slot. If a user pays more, the user could transmit on the slots marked by 1. For a user pays less, the user could transmit on the slot marked by 2.

Figure 3C:
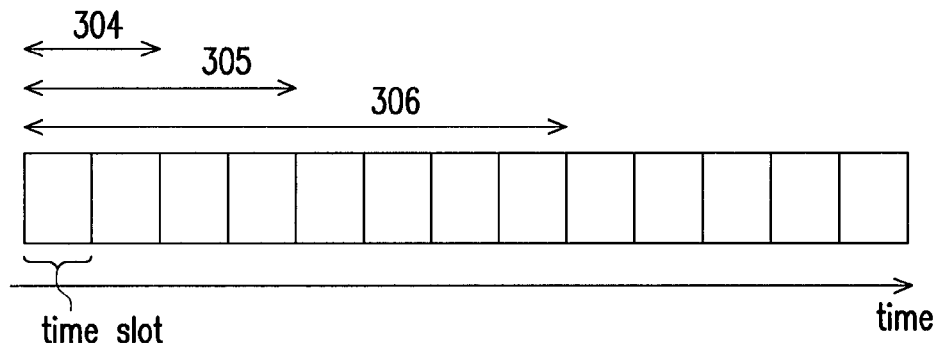
FIG. 3C illustrates a resource allocation method with random back-off window size in accordance with one of the exemplary embodiments of the present disclosure.

For an exemplary embodiment, the backoff window size could be a variable which decides how much a user could also be charged. A contention-based mechanism would normally rely on the backoff window to resolve contention collision for the random access process. The more a user is willing to pay, the smaller the random backoff window size would become. FIG. 3C illustrates a resource allocation method with random back-off window size in accordance with one of the exemplary embodiments of the present disclosure. FIG. 3C shows three random back-off window sizes 304, 305, and 306. A user who is the most willing to pay would enjoy the smallest backoff window size 304, and likewise, A user who pays the least would have the longest backoff window size 306.

Various embodiments could be proposed for different priority schemes. For instance, the number of contention slots could be based on how much a user is willing to pay. A user who is willing to pay more would enjoy a higher number of contention slots. For another embodiment, the maximum transmission power could also be determined according to the willingness of a user to pay. A user who pays more would be allowed to transmit with a higher maximum transmission power. For another embodiment, a user could be assigned a priority. A user who pays more would be assigned a higher priority than a user who pays less, and a user with a higher priority identity would be given a preference to access over a user with a lower priority.

Furthermore, as far as charging and resource allocation is concerned, D2D UEs could be categorized into mobile devices and non-mobile devices. For the D2D UEs which tend to be used as infrastructures and inherently without any mobility such as a smart meter for example, each of the UEs could be allocated with a fixed identity. These non-mobile devices could be charged more since they each occupies a fixed identity for a long period of time. These identities could be allocated according the services subscribed by a user. Two or more devices may also share the same identity in a time division manner in order to reduce the total number of all required identities.

For mobile D2D UEs which could migrate from one control node to another, these mobile UEs could be assigned according to temporary identities. Also when one such mobile UE migrate from one control node to another control node, the mobile UE could change from one temporary identity to another temporary identity. These mobile D2D UEs could be require to update their identities every given time period. Under normal circumstances, a mobile D2D device is authorized by a mobile identity, and a non-mobile D2D device is authorized a non-mobile identity. When the mobile device is moved to the coverage of another control node, it would be authorized with another identity which is a mobile identity.

Figure 4:
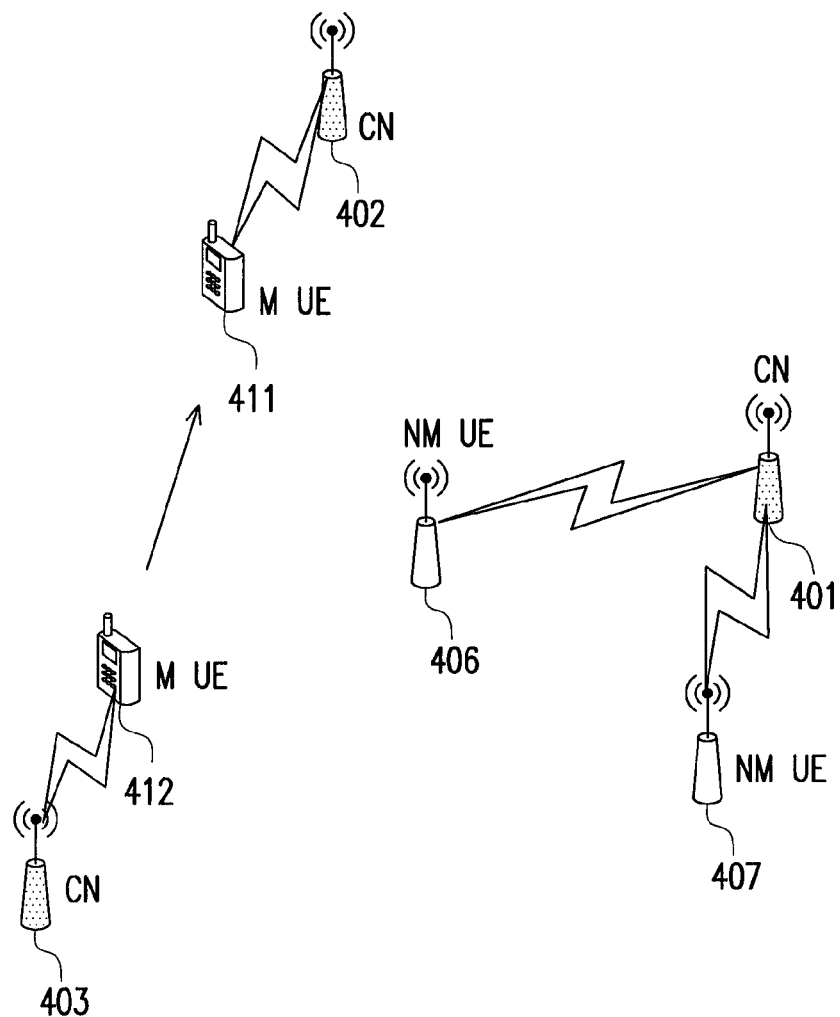
FIG. 4 illustrates an exemplary system which shows mobile and non-mobile D2D devices.

FIG. 4 illustrates an exemplary system which shows mobile and non-mobile D2D devices. In the system, the control nodes 401 402 and 403 provide coverage to mobile UEs 411 412 and non-mobile UEs 406 407. For non-mobile D2D UEs, they are authorized with fix identities through the control node 401. For mobile D2D devices 411 and 412 which may hop from one control node 412 to another control node 402, they could be authorized from one temporary identity to another temporary identity.

Figure 5A:
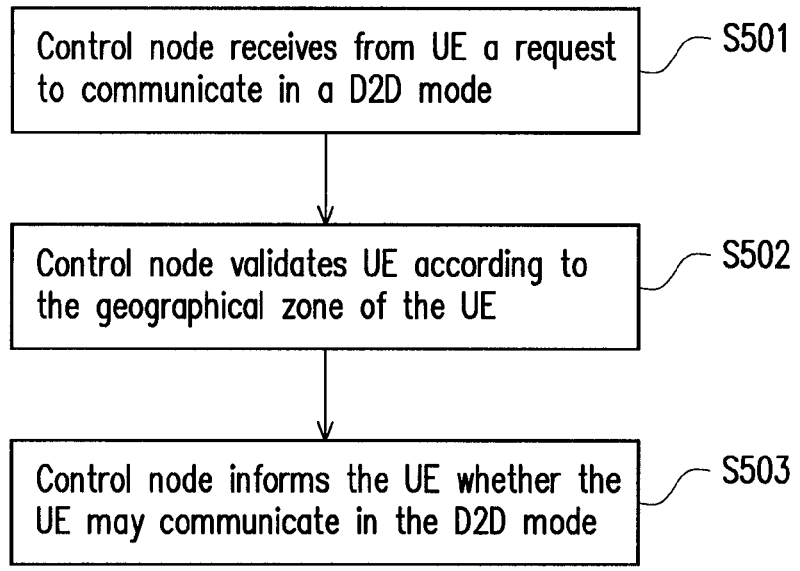
FIG. 5A is a flow charting illustrating the proposed D2D resource management method from the view point of a control node.

FIG. 5A is a flow charting illustrating the proposed D2D resource management method from the view point of a control node. In step S501, a control node would receive from a user equipment a request to communicate in a D2D mode. In step S502, the control node would validate the user equipment based on the geographical zone in which the user equipment is located after user equipment has requested to communicate in the D2D mode. If the control node determines that the user equipment is in a valid geographical zone, the user equipment could be authorized by the spectrum owner to engage in D2D communications using the radio resources of the spectrum owner. In step S503, the control node would notify the user equipment whether the user equipment may communicate in the D2D mode after the user equipment has been properly authorized. The user equipment could then be charged based on any of the aforementioned charging and leasing schemes.

Figure 5B:
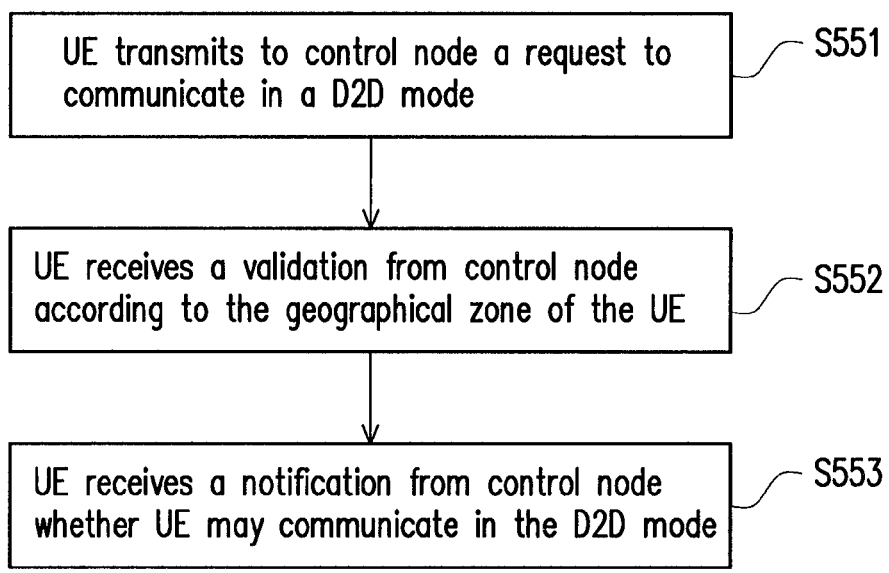
FIG. 5B is a flow charting illustrating the proposed D2D resource management method from the view point of a user equipment.

FIG. 5B is a flow charting illustrating the proposed D2D resource management method from the view point of a user equipment. In step S551, a user equipment would transmit to a control node a request to communicate in a D2D mode. In step S552, the user equipment could receive a validation from the control node based on the geographical zone in which the user equipment is located after user equipment has requested to communicate in the D2D mode. If the user equipment has been determined to be in a valid geographical zone, the user equipment could be authorized by the spectrum owner to engage in D2D communications using the radio resources of the spectrum owner. In step S553, the user equipment would receive a notification from a control node whether the user equipment may communicate in the D2D mode after the user equipment has been properly authorized. The user equipment could then be charged based on any of the aforementioned charging and leasing schemes.

For the aforementioned D2D resource management scheme, if a UE is non-mobile and is located out side the range of the radio coverage of any control node, a D2D wireless service could still be provided to the UE through a network topology-based management as long as the UE is under the radio coverage of another non-mobile UE. Also, if a non-mobile UE is located in an invalid geographical zone and therefore cannot engage in the D2D mode of communications with another UE, a D2D wireless service could still be provided to the non-mobile UE through the network topology-based management by attaching the non-mobile UE to a control node nearby.

For example, referring back to FIGS. 2A and 2B, if a non-mobile UE were hypothetically located outside the geographical zone formed by the control nodes 201, 202, 203, 209, 208, 207, 206, or if a non-mobile UE were located outside the outer boundary 239 of the extended geographical zone, a D2D wireless service could still be provided to the UE through a network topology based management as long as the UE is under the radio coverage of another non-mobile UE. If a non-mobile UE were located in an invalid region 223 225, or in fact were located in a valid region 221 222 224 as well, a D2D wireless service could still be provided to the non-mobile UE through the network topology based management by attaching the non-mobile UE to a control node 201~209 nearby.

The concept of the network topology management method would be elucidated as follows. Referring back to FIG. 4, specifically to the setup including the control node 401 and the non-mobile UE 407, one of the main ideas of the concept of the network topology management method is that a D2D wireless service could be provided to UEs by having the control node 401 to maintain a topology of UEs in a tree (or chain) like fashion such that if a UE were to fall outside the coverage range of the control node 401, the UE could still communicate in the D2D mode through another non-mobile UE which is within the radio range of the control node 401 and therefore could act as a relay for the UE outside the range of the control node 401.

Figure 6:
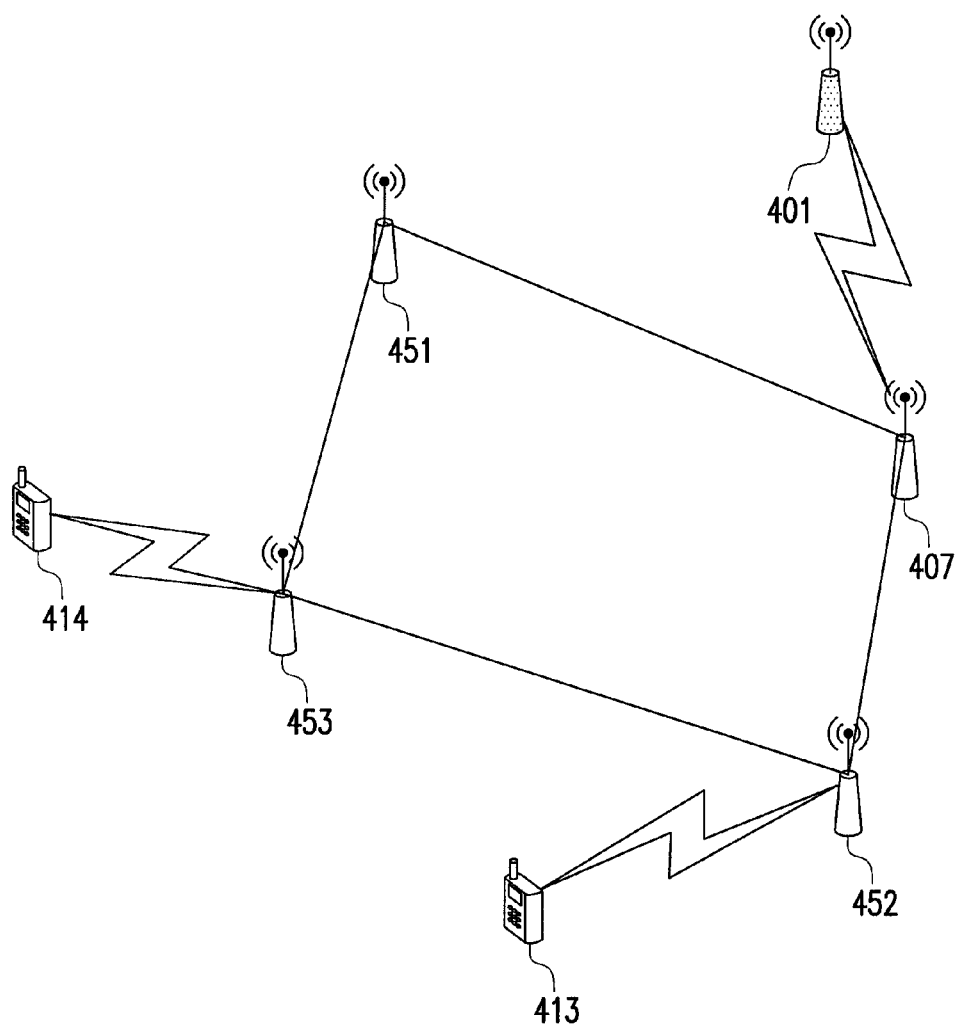
FIG. 6 illustrates the concept of a network topology based management for non-mobile D2D devices.

FIG. 6 further illustrates the concept of a network topology based management for D2D UEs. Supposedly that the control node 401 could communicate with a non-mobile UE 407 which is within the radio range of the control node 401. The non-mobile UE 407 could then act as a relay for other UEs 451 and 452 to communicate in the D2D mode as long as the UEs 451 and 452 are within the radio range of the UE 451. Since the non-mobile UE 407 is assigned with a fixed identity, the control node could keep track of the non-mobile UE 407 through the fixed identity of the non-mobile UE 407. If the UEs 451 and 452 were to be non-mobile, the UEs 451 and 452 would also be assigned with fixed identities. Subsequently, the control node 401 would be able to keep track of the non-mobile UEs 407, 451, and 452 through their fixed identities.

The UE 451 may even communicate with the UE 452 in the D2D mode through the radio coverage of the UE 407 without having the control node 401 delivering wireless data constantly in between the non-mobile UEs 451 and 452. The UE 407 may also act as a relay between the UE 451 and the UE 452 to facilitate the D2D mode of communications if the UE 451 and the UE 452 are within the radio coverage of the control node 401.

Similarly, the non-mobile UE 451 and/or the non-mobile UE 452 may act as a relay for the UE 453. In the event that the UE 453 is also non-mobile, the non-mobile UE 453 may in turn act as a relay to provide radio coverage to a mobile UE 414. Similarly, the non-mobile UE 452 may act as a relay and provide D2D radio coverage to the mobile UE 413. Thus, the mobile UE 414 is attached to the control node 401 indirectly through the non-mobile UEs 453 and 451 as long as the link 401 451 453 and 414 is formed in an unbroken fashion as each node of the link is under adequate radio coverage of a neighboring node. Therefore, for the scenario of FIG. 6, the control node 401 would keep track of the non-mobile UEs 407, 451, 452, and 453 as each of which could serve as a relay to provide D2D communications to other mobile UEs.

For another embodiment, the non-mobile 453 and mobile UE 414 as a unit could be implemented as an individual private network. Generally, a network could assign and keep track of a non-mobile UE through a static ID, and the non-mobile UE could in turn assign IDs to other UEs attached to the non-mobile UE.

In general, since non-mobile UEs are assigned with fix identities, a control node may keep track of these non-mobile UEs. For UEs with non-mobility identities, a coordinator could acquire network topology through D2D UEs which are directly connected to the coordinate as these UEs are assigned with fixed identities. These UEs could further collect the identities of the next group of UEs which are connected to them and are assigned fix identities. The above mentioned steps could be repeated until the complete network topology of D2D UEs having fix identities is obtained. As for the D2D UEs with temporary identities, they could be appended to UEs with fix identities. Therefore, for non-mobile UEs which have been authorized with fixed identities, they could been seen as extensions of a control node by extending the radio coverage of the control node and thus could provide D2D mode of communications to UEs outside the range of the control node.

Establishing a network topology may require connective relationships among devices, such as a control node, mobile UEs and non-mobile UEs, be known as well as the locations or the relative locations among these devices. The location of a device could be useful to identify relationships between a device and its surrounding devices. In general, the absolute position of a UE could be performed by a common positioning device such as a global positioning satellite (GPS) positioning device. The absolute location of a control node could be obtained by a GPS positioning device, or it could be supplied by a network. The location of a device in relationship to another device (i.e. the relative location of a device) could also be calculated and determined. When devices engage in the D2D mode of communications with one another, the proximity information of each device could be delivered to the network. In other words, the determination of the proximity information of each device could be assisted by D2D communications of these above mentioned devices.

Figure 7:
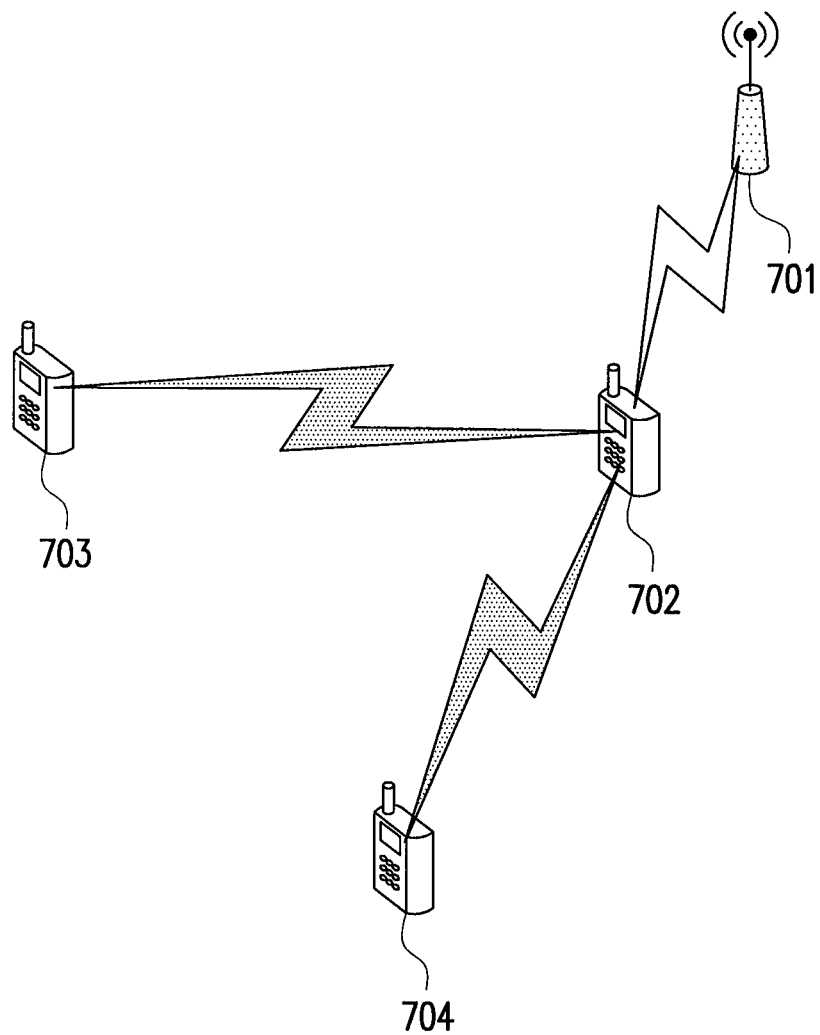
FIG. 7 illustrates D2D communications assisted proximity indication in accordance with one of the exemplary embodiments of the present disclosure.

FIG. 7 illustrates D2D communications assisted proximity indication in accordance with one of the exemplary embodiments of the present disclosure. FIG. 7 includes a control node 701 which has established a wireless connection with a UE 702 which in turns may communicate directly with two other UEs 703 704. The UE 702 could report the absolute position of itself to the control node 701. The UE 702 could also report to the control node 701 that it is within radio communications ranges of two UEs 703 704. (i.e. the UEs 703 704 are in proximity with the UE 702) The UEs 703 could also report to the control node 701 through the relay of the UE 702 its location and whether other nearby UEs are within the radio range of the UE 703. The UEs 704 could also report to the control node 701 through the relay of the UE 702 its location and whether other nearby UEs are within the radio range of the UE 704. In this way, the control node 701 could maintain a complete topology of D2D devices according to proximity reporting of the UEs.

Figure 8A:
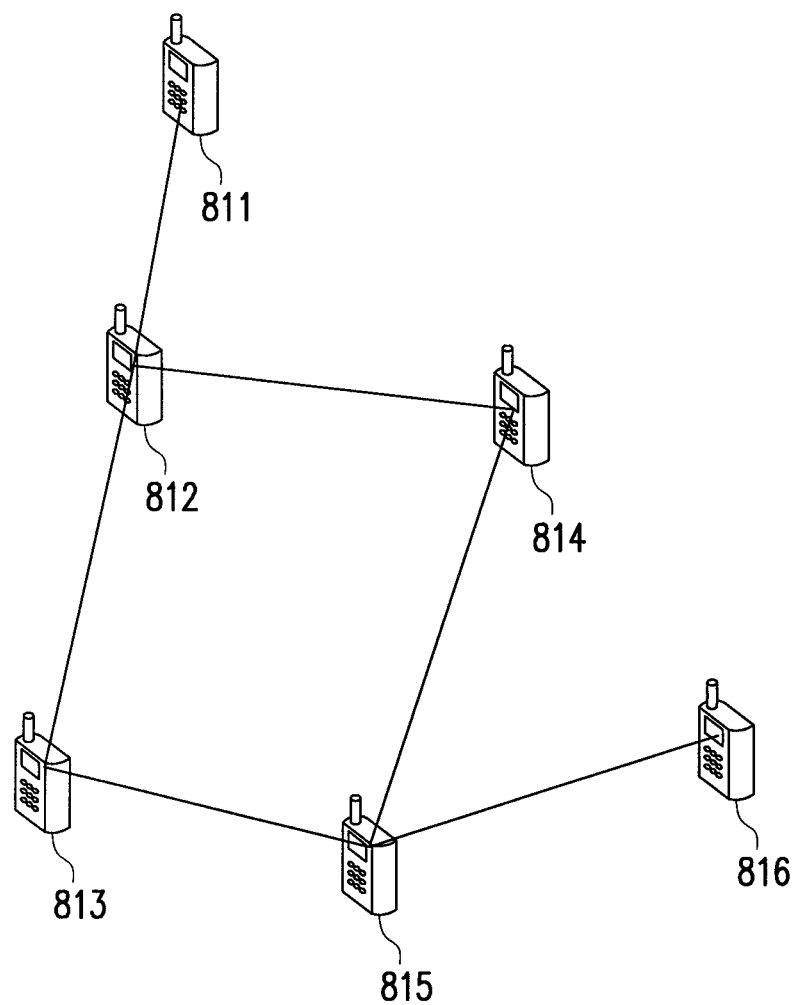
FIG. 8A-8B illustrates remote topology maintenance by a data center in accordance with one of the exemplary embodiments of the present disclosure.
Figure 8B:
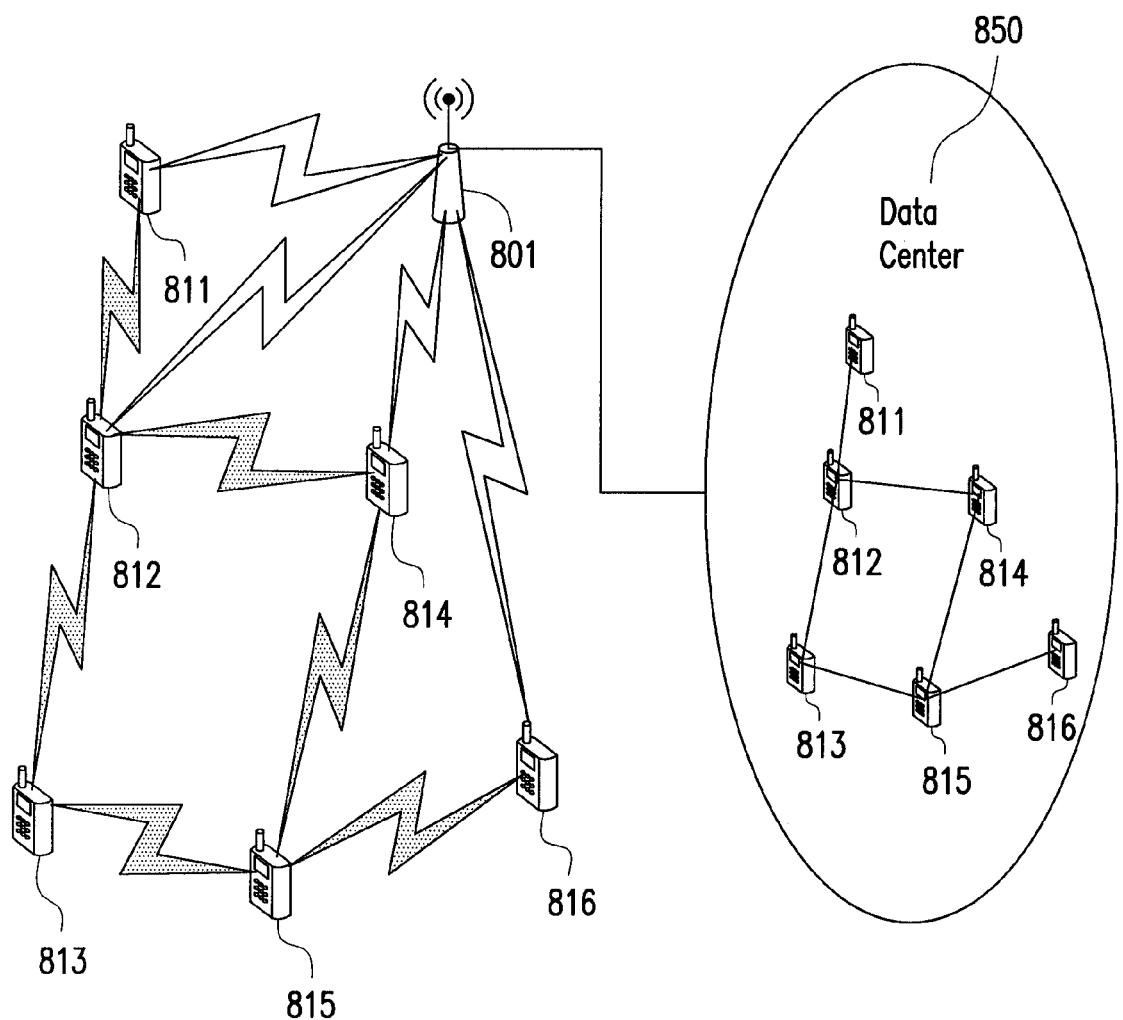

FIG. 8A-8B illustrates remote topology maintenance by a data center in accordance with one of the exemplary embodiments of the present disclosure. Suppose that there exists a network topology has been formed by a chain of UEs 811~816 as illustrated in FIG. 8A. In particular, UE 811, 812, 814, and 816 are in the radio range of the control node 801 as illustrated in FIG. 8B, the topology could be extended to accommodate UEs 813 and 815 which exist outside the radio range of the control node so that all of the UEs 811~816 could communicate in D2D mode with one another through the relays of other non-mobile UEs. The control node 801 would maintain the network topology of FIG. 8A after available proximity reporting is received from the UEs 811~816. The control node 801 would then forward the network topology to a data center 850 in the network. The data center 850 would then maintain a complete network topology under the control node 801.

The network topology could be updated as follows. For one embodiment, in response to a first device not being able to discover in proximity a second device which was previously in proximity of the first device and is a part of the network topology, the first device would report to the control node that the second device is not in proximity and has therefore been missing from the topology. In response to the first device reporting to the control node, the control node would then report to a data center which would then update the topology accordingly. For instance, if the UE 812 is unable to detect the presence of UE 813 within the radio range of the UE 812, the UE 812 would then report to the control node 801 the updated topology. The control node 801 would then forward the information to the data center 850 which would then update the topology to not include the UE 813.

For another exemplary embodiment, a timer could be kept by a control node such that when a relationship between two devices no longer exists in the proximity reporting received by the control node, the control node would update the topology to no longer include the relationship after the relationship has been missing for longer than a predetermined period. For example, a timer could be kept by the control node 801 such that when the UE 813 has been missing for a predetermined period such as 10 seconds, 45 seconds, or 60 seconds, the UE 813 would be removed from the topology, and the control node 801 would forward the updated topology to the data center 850 accordingly.

Figure 9A:
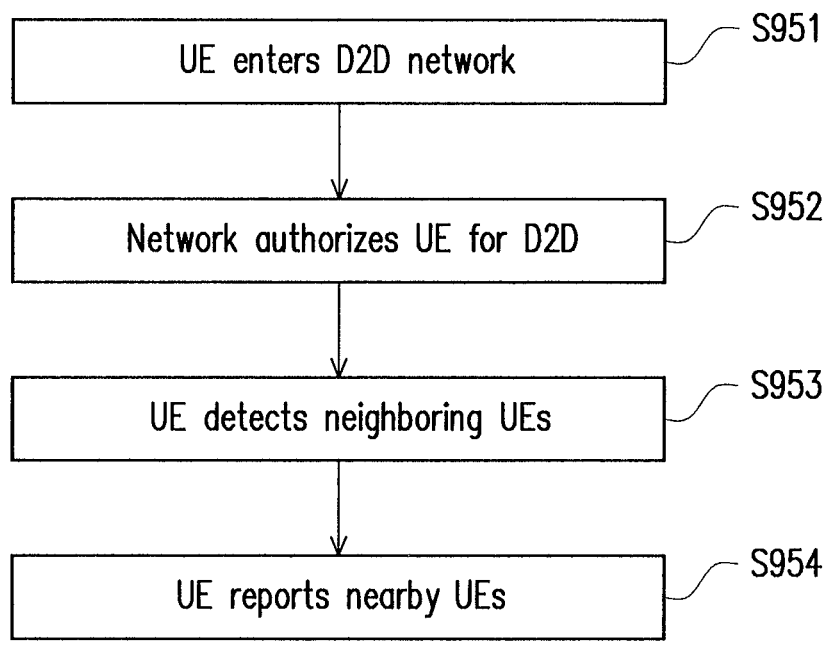
FIG. 9A-FIG. 9B illustrates a network entry procedure in accordance with one of the exemplary embodiments of the present disclosure.

FIG. 9A illustrates a network entry procedure in accordance with one of the exemplary embodiments of the present disclosure. The network entry procedure could be described as follows. In step S951, a UE enters a D2D network. In step S952, the network authorizes the UE for D2D communications in the network. In step S953, the UE detects neighboring UEs in the indicated D2D resource. In step 954, the UE reports neighboring UEs to a control node.

Figure 9B:
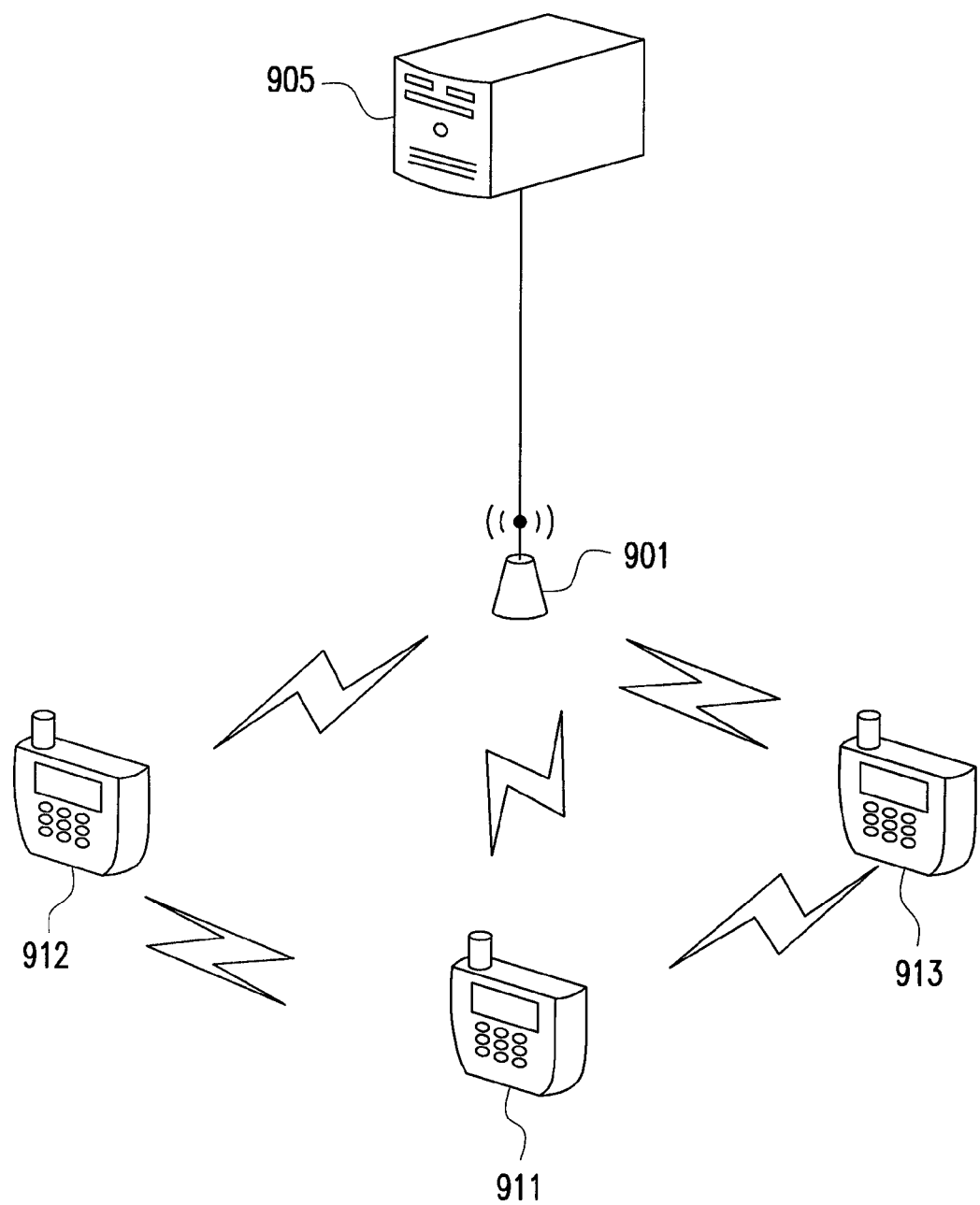

The network entry procedure of FIG. 9A could be elucidated with an example as illustrated by the scenario of FIG. 9B. In the scenario of FIG. 9B, it is assumed that the UE 911 enters the D2D network which includes a server/cloud 905, a control node, two neighboring UEs 912 and 913 which are within the radio range of the UE 911. The server/cloud 905 could be the aforementioned spectrum owner/charging server 120, or it could be an external server (e.g. military 140, emergency service 150, and other services 160) which could negotiate with the spectrum owner/charging server 120 through the transaction center 130. In step S951, the UE 911 enters a D2D network. In step S952, a network server/cloud 905 authorizes the UE 911 for D2D communications in the network. In step S953, the UE 911 detects neighboring UEs, namely, the UE 912 and the UE 913. In step 954, the UE 911 reports neighboring UEs 912 913 to a control node 901.

It should be noted that as a network topology is being managed, the procedures involving authorization and resource allocation would be similar to the aforementioned procedure as previously disclosed and thus the actual discussion would not be repeated.

Figure 9C:
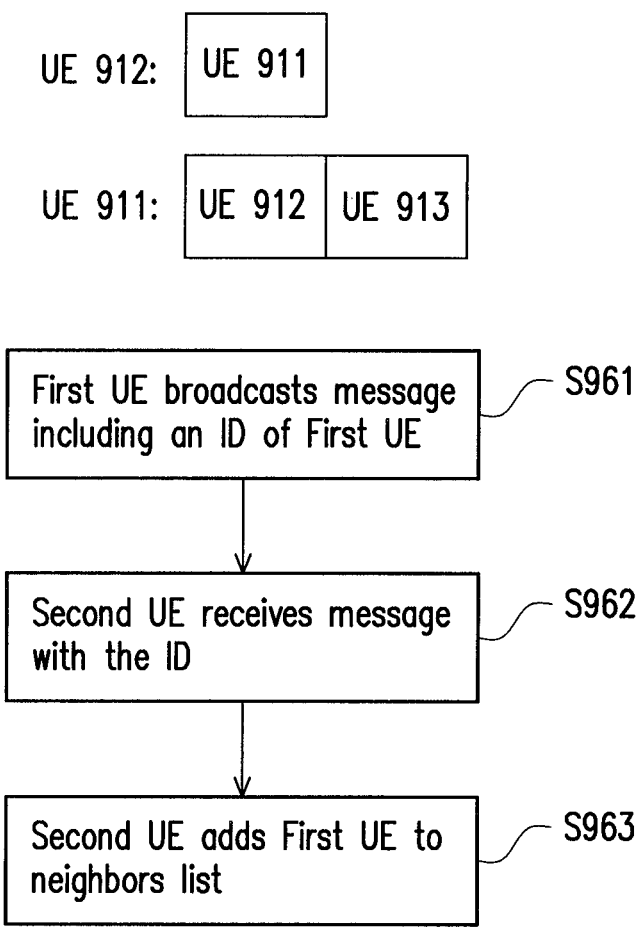
FIG. 9C illustrates a neighboring detection procedure in accordance with one of the exemplary embodiments of the present disclosure.

FIG. 9C illustrates a neighboring detection procedure in accordance with one of the exemplary embodiments of the present disclosure. In step S961, a first UE periodically broadcasts a message which includes an ID of the First UE. In step S962, a second UE within the broadcast range of the first UE may receive the message containing the ID. In step S963, the second UE adds the First UE to neighbours list. Referring back to the example of FIG. 9B together with FIG. 9C, in step S961, the UE 911 broadcasts its ID periodically. In step S962, the UE 912 receives the broadcasted ID of the UE 911. In step S963, the UE 912 adds the UE 911 to its neighbours list. Based on the above mentioned neighboring detection procedure, UE 912 would have UE 911 in its neighbours list, and UE 911 would have UE 912 and UE 913 in its neighbours list.

Figures 9D, 9E:
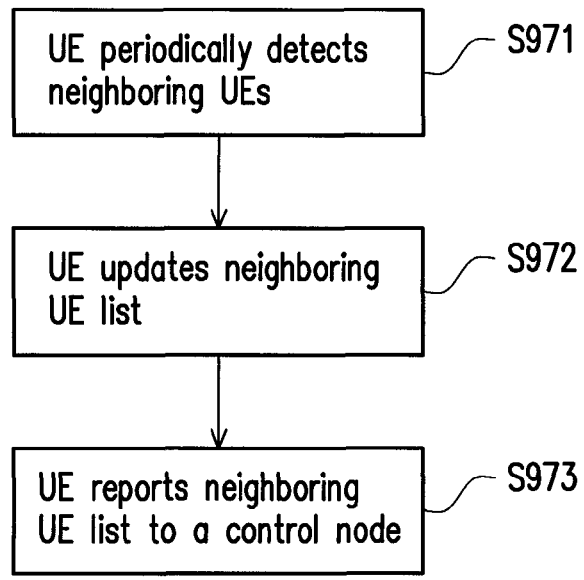
FIG. 9D illustrates a network update procedure in accordance with one of the exemplary embodiments of the present disclosure.
FIG. 9E illustrates a neighboring table in accordance with one of the exemplary embodiments of the present application.

FIG. 9D illustrates a network update procedure in accordance with one of the exemplary embodiments of the present disclosure. In step S971, a UE periodically detects neighboring UEs. In step S972, a UE updates its neighbors UE list after neighboring UEs has been scanned. In step S973, the UE reports the updated neighbors UE list to a control.

According to one exemplary embodiment, a neighbours UE list could be compiled as a neighboring table which would then be sent to a control node. FIG. 9E illustrates a neighboring table in accordance with one of the exemplary embodiments of the present application. Using the example of FIG. 9B, UE 911 would have UE 912 and 913 both marked as a yes since both UE 912 and UE 913 are in the proximity of UE 911. Likewise, UE 912 would have UE 911 marked as yes and UE 913 marked as no, and UE 913 would have UE 911 marked as yes and UE 912 marked as no.

With the procedures of entry, update, and detection being defined, the network would still need to know the locations of the UE members of a topology in order to authorize and to allocation resources for the D2D UEs. The conventional positioning method usually requires a UE to detect its absolute position in terms of longitude and latitude and report the absolute position to the network. However, according to the present disclosure, a device may only need to know the relative position of another device in order to adequately record a network topology. The relative position between two devices could include distance and angle. For instance, a first UE could be said to be 50 meters away from a second UE. A first UE could be said to be 5 meters away from a second UE. A first UE could be said to be 35 degrees from the north of a second UE. Also the relative position between two devices could include the relative time from one device to travel to another device and the relative direction between two devices. (i.e. one device is in front or back of another device.)

The concept of relative information may also apply to other variables such as relative temperature between two devices in the case when one device is a thermometer. By transmitting relative temperature of a device relative to a reference device, a device does not need to know its temperature in the absolute. Also the concept of relative information may apply to traffic loading in the case when a device is a motor vehicle as the vehicle only need to transmit relative traffic loading information in relationship to a reference vehicle. The relative information may also be used to transmit information such as a car plate. For the case of smart meters, each smart meter could also deliver any information in the relative rather than the absolute.

The advantage of transmitting relative information includes one being that applications in a device might not need to know the absolute position. Applications such as instant messengers or some social networking applications might not need to know positions in the absolute. Devices which do not have any positioning hardware could benefit from delivering relative information to a neighboring device and then by relying on the neighboring device to relay to the relative information to an eventual device which would convert the relative information to the absolute. For specific environments such as in a tunnel where a device might not receive strong enough signal to perform absolute positioning and would therefore utilize the other devices to obtain or to calculate its own position.

Figure 10A:
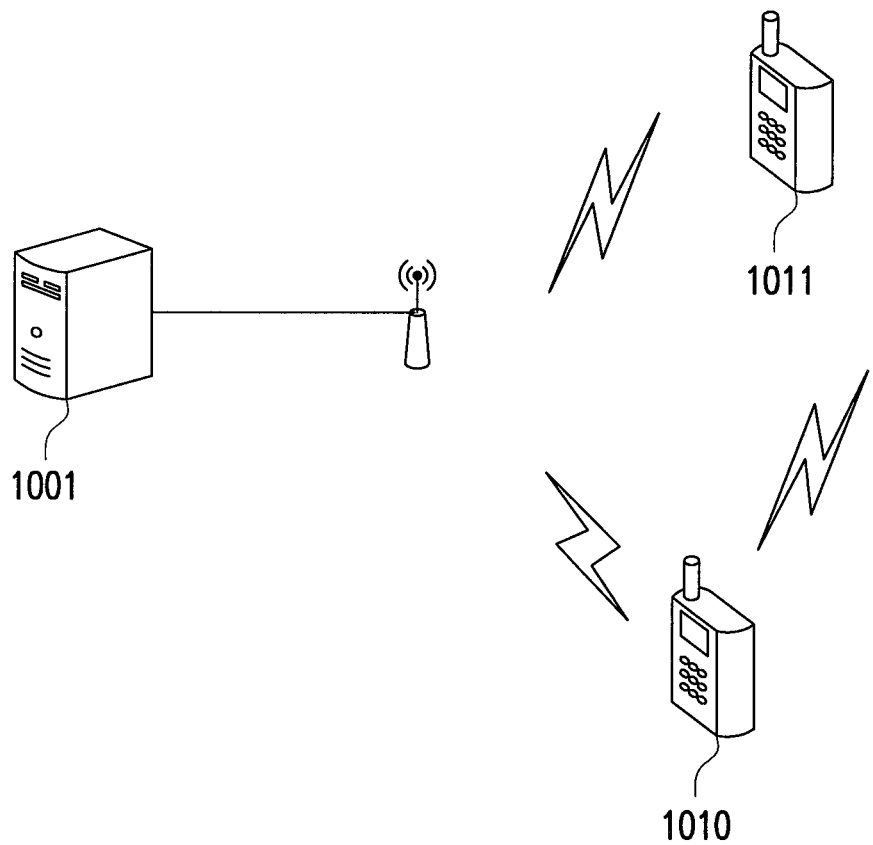
FIG. 10A illustrates a device position reporting method to a server in accordance with one of the exemplary embodiments of the present application.

A device could report relative information to a server or to another neighboring D2D device in proximity. FIG. 10A illustrates a device position reporting method to a server in accordance with one of the exemplary embodiments of the present application. For this embodiment, a first UE device calculates and reports to a server. First a server/cloud 1001 may optionally request the relative position of a second UE 1011 from a first UE 1010. The first UE 1010 would then calculate the relative position of the second UE 1011 and report the relative position of second UE 1011 to the server/cloud 1001.

For another exemplary embodiment, a second UE may calculate and report to a server. For instance, the server/cloud 1001 may optionally request the position of the second UE 1011 relative to the first UE 1010 and may only require such information in the relative. The first UE 1010 would then request from the second UE 1011 the absolute position of the second UE 1011. The second UE 1011 would then obtain its absolute position and calculates its position relative to the first UE 1010. The second UE 1011 would then send the relative position to the first UE 1010, and the first UE 1010 may report the relative position of the second UE 1011 relative to the first UE 1010 to the server/cloud 1001.

Figure 10B:
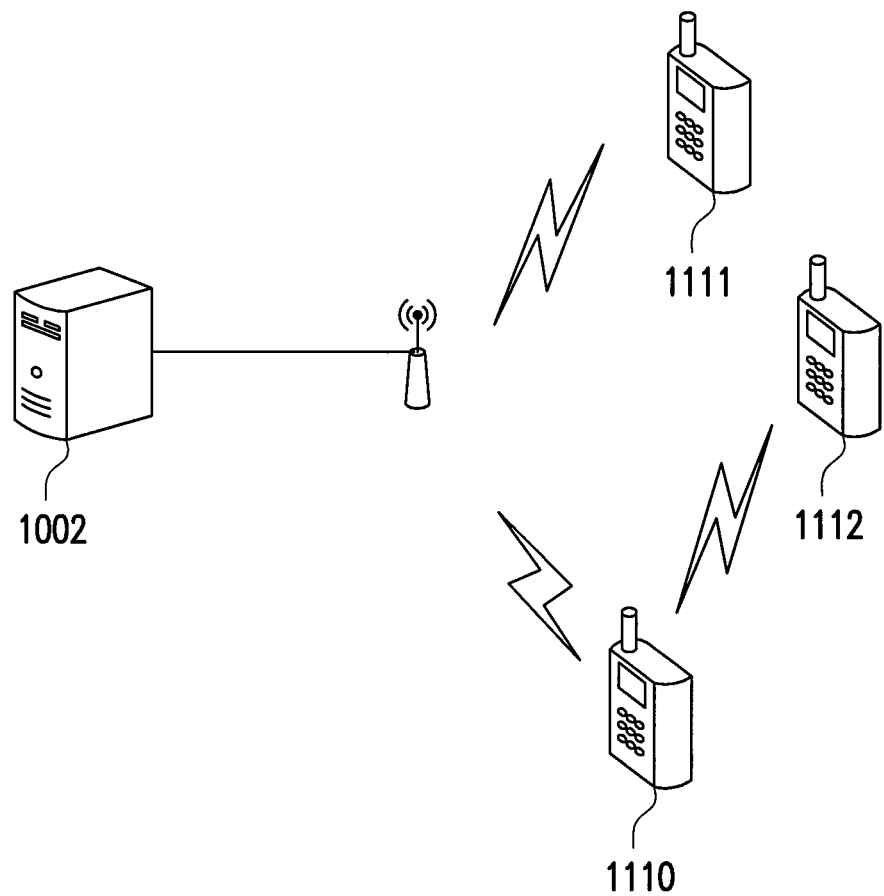
FIG. 10B illustrates a device position reporting method to another device in accordance with one of the exemplary embodiments of the present application.

FIG. 10B illustrates a device position reporting method to another device in accordance with one of the exemplary embodiments of the present application. In this exemplary embodiment, a first device calculates and report directly to another device. In the scenario of FIG. 10B, there are three D2D UEs in proximity of each other, namely, a first UE 1110, a second UE 1111, and a third UE 1112. First, the third UE 1112 optionally requests from the first UE 1110 for the relative position of the second UE 1111. The first UE 1110 then calculates the relative position of the second UE 1111 and reports the relative position of the second UE 1111 to the third UE 1112.

For another exemplary embodiment, the second UE 1111 may calculates and report directly to another device. First, the third UE 1112 optionally requests relative position of the second UE 1111 relative to the first UE 1110. The first UE 1110 then requests for the absolute position of the second UE 1111. The second UE calculates the absolute position of the second UE 1111. The second UE 1111 then calculates the relative position of the first UE 1110 based on the absolute position of the second UE 1111. The second UE 1111 then sends the relative position to the first UE 1110. The first UE 1110 then would deliver the relative position of the second UE 1111 relative to the first UE 1110 to the third UE 1112.

Figure 10C:
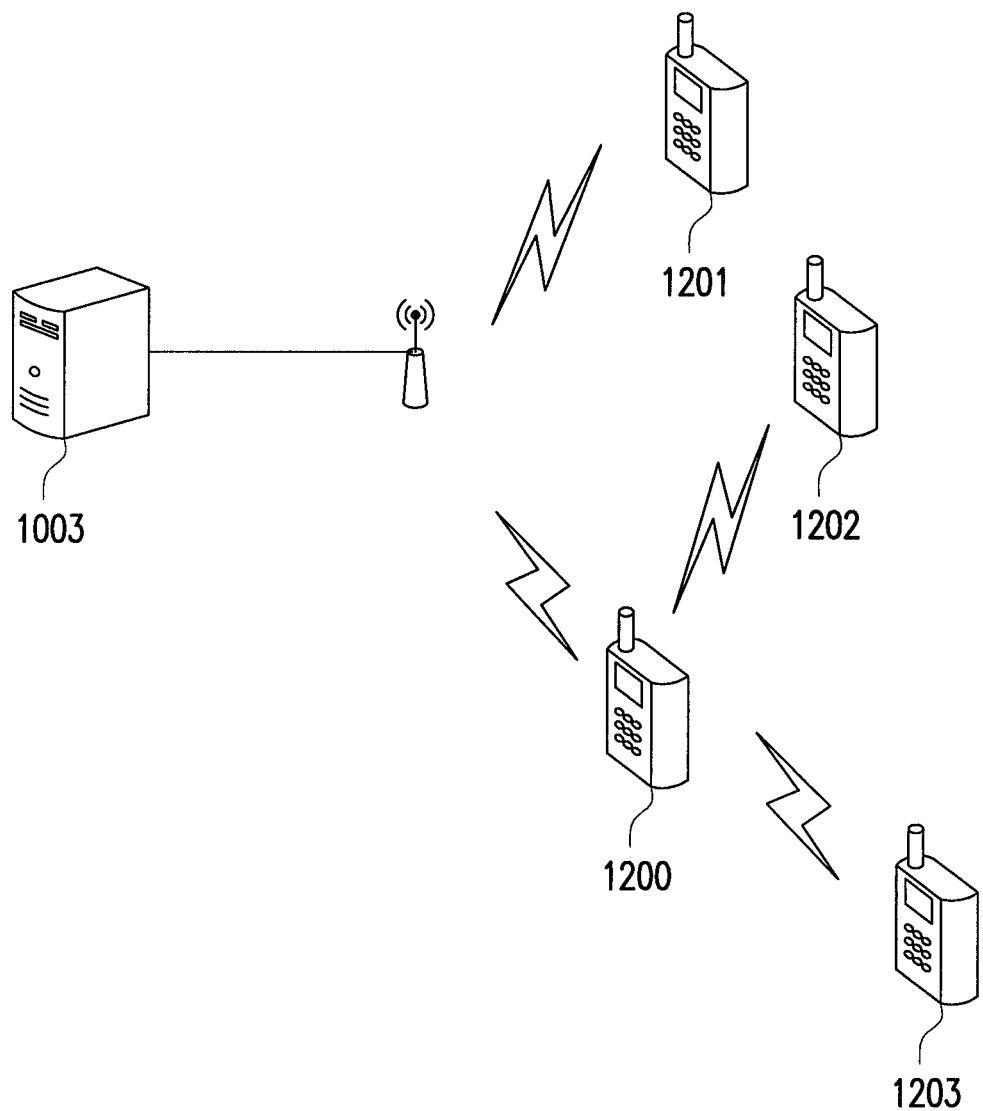
FIG. 10C illustrates a device position reporting method for a group of devices in accordance with one of the exemplary embodiments of the present application.

FIG. 10C illustrates a device position reporting method for a group of devices in accordance with one of the exemplary embodiments of the present application. In this exemplary embodiment, after a server optionally requests from a group of UEs in proximity, one of the UEs report positions of all of the UEs in the group to the server. First, the server/cloud 1002 may optionally request from a first UE 1200 for the absolute position of all the UEs in proximity to the first UE 1200 including the second UE 1201, the third UE 1202, and the fourth UE 1203. The first UE 1200 then requests or calculates or collects the absolute position of the second UE 1201, the third UE 1202, and the fourth UE 1203. The first UE 1200 could then report to the server/cloud 1003 the absolute position of all the UEs 1200~1203.

For another embodiment, instead of reporting to the server/cloud 1003 the raw absolute position of all the UEs 1200~1203, the first UE 1200 could report the data of the absolute position in a compressed form. The compressed form takes in the raw data of the absolute position and convert the raw absolute data into a relative data in reference to a reference UE. For example, if first UE 1200 is situated in longitude 25.0392 and latitude 121.525, and the second UE is located in longitude 25.0393 and latitude 121.525, the first UE 1200 would only need to report the position of the second UE 1201 as longitude 0.0001 and latitude 0 relative to the first UE 1200 such less bits are required to represent the positioning data.

Figure 11:
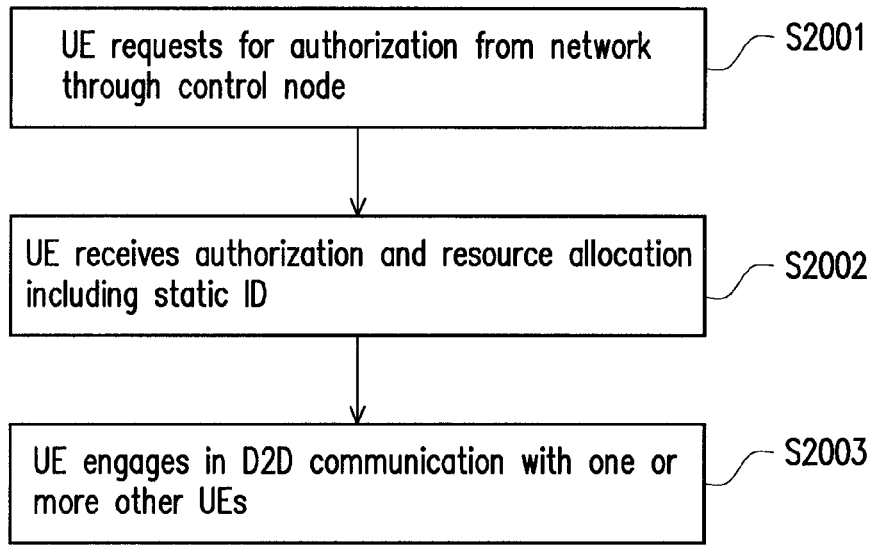
FIG. 11 is a flow charting illustrating network topology based management method from the view point of a user equipment in accordance with one of the exemplary embodiments of the present application.

FIG. 11 is a flow charting illustrating network topology based management method from the view point of a user equipment in accordance with one of the exemplary embodiments of the present application. In step S2001, a UE requests for authorization from a network through a control node. If the UE is within the radio range of the control node, the UE may request for a neighbors list from the control node. Otherwise, the UE may detect the presence of neighboring UEs and utilize a non-mobile UE as a relay to request for the authorization from the network. In step S2002, the UE receives authorization and resource allocation which includes but not limited to a static ID. In this step, the spectrum owner grants the UE to access the spectrum through the control node, and the UE could be allocated with a static ID if the UE were non-mobile or a temporarily ID if the UE were mobile. In step S2003, the UE engages in D2D communications with one or more other UEs.

Figure 12:
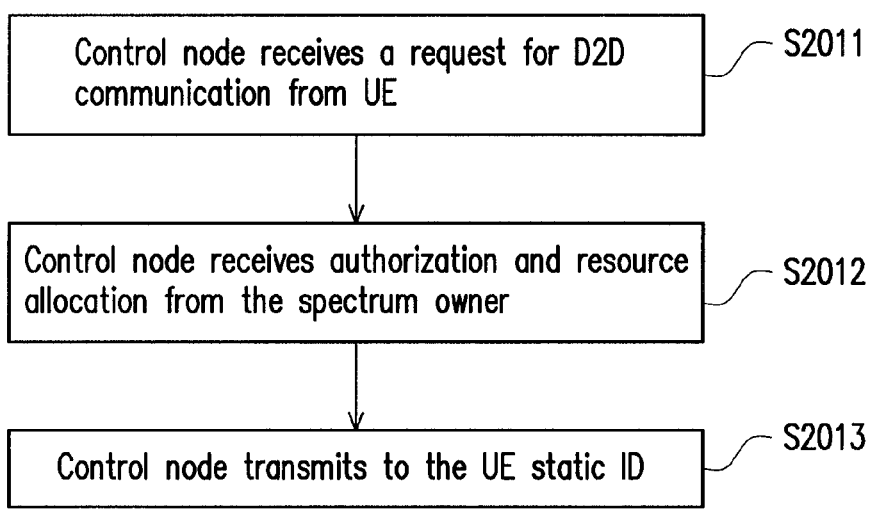
FIG. 12 is a flow charting illustrating the proposed D2D resource management method from the view point of a control node in accordance with one of the exemplary embodiments of the present application.

FIG. 12 is a flow charting illustrating the proposed D2D resource management method from the view point of a control node in accordance with one of the exemplary embodiments of the present application. In step S2011, the control node receives a request for D2D communications from a UE. The control node could also receive a neighbors list or an updated neighbors list from the UE. The control could then deliver the request for the D2D communications for the UE, and the delivery may include an updated network topology to be recorded by a data center within the network. In step S2012, the control node receives authorization and resource allocation from the spectrum owner. In step S2013, the control node transmits to the UE the authorization and resource allocation which includes but not limited to a static ID.

In view of the aforementioned descriptions, the present disclosure proposes a method to achieve D2D communicate resource management such that a network could allocate D2D resources to D2D UEs and performs resource leasing and charging. The method includes validating UEs for D2D mode of the communications according to the geographical zones in which they are located, performing authorization and resource allocation, and managing a network topology for UEs such that they could communicate without the assistance of a control node even when they are located outside the radio range of a control node.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A resource management method for device to device (D2D) communications in a network, adapted for a control node, and the method comprising:
receiving from a first device a request to communicate in a D2D mode;
validating the first device according to a geographical zone in which the first device is located in response to the request to communicate in the D2D mode, wherein the geographical zone is formed by at least three control nodes; and
notifying the first device whether the first device may communicate in the D2D mode in response to validating the first device,
wherein the geographical zone is formed by the at least three control nodes comprises the geographical zone is formed by a first area which is enclosed by the at least three control nodes,
wherein the geographical zone further extends behind the first area to include a radio range of the at least three control nodes.

2. The method of claim 1, wherein the control node is one of an eNB, a base station, a relay station or a user equipment.

3. The method of claim 1, wherein in the D2D mode, the first device directly communicates with a second device in the network without having the control node relaying data in between.

4. The method of claim 1 wherein the step of validating the first device according to the geographical zone in which the first device is located in response to the request to communicate in the D2D mode, wherein the geographical zone is formed by the at least three control nodes further comprising:
determining whether the geographical zone in which the first device is located is a valid geographical zone.

5. The method of claim 4 further comprising:
if the all of the at least three control nodes indicate that they would each allow the D2D mode, then the geographical zone is the valid geographical zone; otherwise, the geographical zone is not the valid geographical zone.

6. The method of claim 5 further comprising:
when the first device is determined to be in the valid geographical zone, the first device may communicate with another device in a valid geographical zone.

7. The method of claim 4, wherein the step of determining whether the geographical zone in which the first device is located is a valid geographical zone comprising:
receiving from the first device an indication as for whether the first device is in a valid geographical zone; and
determining whether the first device is in the valid geographical zone directly based on the indication.

8. The method of claim 4, wherein the step of determining whether the geographical zone in which the first device is located is a valid geographical zone comprising:
receiving from the first device a location of the first device; and
determining whether the first device is in a valid geographical zone based on the location of the first device.

9. The method of claim 4, wherein the step of determining whether the geographical zone in which the first device is located is a valid geographical zone comprising:
receiving a pilot signal from the first device;
estimating a location of the first device based on the pilot signal; and
determining whether the first device is in a valid geographical zone based on the location of the first device.

10. The method of claim 1, wherein before the step of notifying the first device whether the first device may communicate in the D2D mode in response to validating the first device, comprising:
receiving authorization of radio resources from a spectrum owner of the network to communicate in the D2D mode.

11. The method of claim 10 wherein before the step of receiving the authorization of radio resources from the spectrum owner of the network to communicate in the D2D mode, comprising:
checking a subscription status of the first device from a server.

12. The method of claim 11 further comprising:
if the subscription status of the first device from the server is valid, then the spectrum owner authorizes radio resources through a transaction center.

13. The method of claim 10, wherein the authorization of radio resources is for time slot in a radio frame used to communicate in the D2D mode.

14. The method of claim 10, wherein the authorization of radio resources is for bandwidths of a radio frame used to communicate in the D2D mode.

15. The method of claim 10, wherein the authorization of radio resources is according to a priority to access the radio resources.

16. The method of claim 1, wherein the control node comprises a transceiver for transmitting and receiving wireless data and a processing circuit coupled to the transceiver for performing the steps of claim 1.

17. A resource management method for device to device (D2D) communications in a network, adapted for a control node, and the method comprising:
receiving from a first device a request to communicate in a D2D mode;
validating the first device according to a geographical zone in which the first device is located in response to the request to communicate in the D2D mode, wherein the geographical zone is formed by at least three control nodes; and
notifying the first device whether the first device may communicate in the D2D mode in response to validating the first device,
wherein before the step of notifying the first device whether the first device may communicate in the D2D mode in response to validating the first device, further comprises:
receiving authorization of radio resources from a spectrum owner of the network to communicate in the D2D mode,
wherein the authorization of radio resources is according to a priority to access the radio resources,
wherein if the priority to access the radio resources is higher, the first device would have a shorter backoff window than another device with the lower priority to access the radio resources than the first device.

18. A resource management method for device to device (D2D) communications in a network, adapted for a control node, and the method comprising:
receiving from a first device a request to communicate in a D2D mode;
validating the first device according to a geographical zone in which the first device is located in response to the request to communicate in the D2D mode, wherein the geographical zone is formed by at least three control nodes; and
notifying the first device whether the first device may communicate in the D2D mode in response to validating the first device,
wherein before the step of notifying the first device whether the first device may communicate in the D2D mode in response to validating the first device, further comprises:
receiving authorization of radio resources from a spectrum owner of the network to communicate in the D2D mode,
wherein the authorization of radio resources is according to a priority to access the radio resources,
wherein if the priority to access the radio resources is higher, the first device would have more contention slots than another device with the lower priority to access the radio resources than the first device.

19. A resource management method for device to device (D2D) communications in a network, adapted for a control node, and the method comprising:
receiving from a first device a request to communicate in a D2D mode;
validating the first device according to a geographical zone in which the first device is located in response to the request to communicate in the D2D mode, wherein the geographical zone is formed by at least three control nodes; and
notifying the first device whether the first device may communicate in the D2D mode in response to validating the first device,
wherein before the step of notifying the first device whether the first device may communicate in the D2D mode in response to validating the first device, further comprises:
receiving authorization of radio resources from a spectrum owner of the network to communicate in the D2D mode,
wherein the authorization of radio resources is according to a priority to access the radio resources,
wherein if the priority to access the radio resources is higher, the first device would have higher maximum transmission power than another device with the lower priority to access the radio resources than the first device.

20. A resource management method for device to device (D2D) communications in a network, adapted for a control node, and the method comprising:
- receiving from a first device a request to communicate in a D2D mode;
- validating the first device according to a geographical zone in which the first device is located in response to the request to communicate in the D2D mode, wherein the geographical zone is formed by at least three control nodes; and
- notifying the first device whether the first device may communicate in the D2D mode in response to validating the first device,
- wherein before the step of notifying the first device whether the first device may communicate in the D2D mode in response to validating the first device, further comprises:
- receiving authorization of radio resources from a spectrum owner of the network to communicate in the D2D mode,
- wherein the authorization of radio resources is according to a priority to access the radio resources,
- wherein if the priority to access the radio resources is higher, the first device would be assigned a higher priority identity than another device with the lower priority to access the radio resources than the first device.

21. A resource management method for device to device (D2D) communications in a network, adapted for a control node, and the method comprising:
- receiving from a first device a request to communicate in a D2D mode;
- validating the first device according to a geographical zone in which the first device is located in response to the request to communicate in the D2D mode, wherein the geographical zone is formed by at least three control nodes; and
- notifying the first device whether the first device may communicate in the D2D mode in response to validating the first device,
- wherein before the step of notifying the first device whether the first device may communicate in the D2D mode in response to validating the first device, further comprises:
- receiving authorization of radio resources from a spectrum owner of the network to communicate in the D2D mode,
- wherein if the first device is mobile, the control node would assign the first device with a temporary identity to access the radio resources to communicate in the D2D mode.

22. The method of claim 21, wherein if the first device is non-mobile, the control node would assign the first device with a fixed identity to access the radio resources to communicate in the D2D mode.

23. The method of claim 22 further comprising:
- the first device authorizes a third device to access the radio resources to communicate in the D2D mode.

24. A resource management method for device to device (D2D) communications in a network, adapted for a user equipment (UE), and the method comprising:
- transmitting to a first target a request to communicate in a D2D mode;
- performing a validation with the first target according to a geographical zone in which the user equipment is located in response to the request to communicate in the D2D mode, wherein the geographical zone is formed by at least three control nodes; and
- receiving a notification from the first target whether the user equipment may communicate in the D2D mode in response to performing the validation with the first target,
- wherein the geographical zone is formed by the at least three control nodes comprises the geographical zone is formed by a first area which is enclosed by the at least three control nodes,
- wherein the geographical zone further extends behind the first area to include a radio range of the at least three control nodes.

25. The method of claim 24, wherein the first target is one of control node, an eNB, a base station, a relay station, or a user equipment.

26. The method of claim 24, wherein in the D2D mode, the user equipment directly communicates with another user equipment in the network without having the first target relaying data in between.

27. The method of claim 24 wherein the step of validating the user equipment according to the geographical zone in which the user equipment is located in response to the request to communicate in the D2D mode, wherein the geographical zone is formed by the at least three control nodes further comprising:
- determining whether the geographical zone in which the user equipment is located is a valid geographical zone.

28. The method of claim 27 further comprising:
- if all of the at least three control nodes indicate that they would each allow the D2D mode, then the geographical zone is the valid geographical zone; otherwise, the geographical zone is not the valid geographical zone.

29. The method of claim 28 further comprising:
- when the user equipment is determined to be in the valid geographical zone, the user equipment may communicate with another user equipment in a valid geographical zone.

30. The method of claim 27, wherein the step of determining whether the geographical zone in which the user equipment is located is the valid geographical zone comprising:
- receiving locations of the at least three control nodes; and
- determining whether the user equipment is located in a valid geographical zone based on the locations of the at least three control nodes.

31. The method of claim 27, wherein the step of determining whether the geographical zone in which the user equipment is located is the valid geographical zone comprising:
- transmitting to the first target a location of the user equipment; and
- receiving from the first target a feedback indicating whether the user equipment is in the valid geographical zone.

32. The method of claim 27, wherein the step of determining whether the geographical zone in which the user equipment is located is the valid geographical zone comprising:
- transmitting a pilot signal to the first target; and
- receiving from the first target a feedback indicating whether the user equipment is in the valid geographical zone.

33. The method of claim 24 further comprising:
- receiving authorization of radio resources from a spectrum owner of the network to communicate in the D2D mode.

34. The method of claim 33 further comprising: receiving authorization from a server.

35. The method of claim 34 further comprising:
- receiving authorization from the server through a transaction center.

36. The method of claim 33, wherein the authorization of radio resources is for time slot in a radio frame used to communicate in the D2D mode.

37. The method of claim 33, wherein the authorization of radio resources is for bandwidths of a radio frame used to communicate in the D2D mode.

38. The method of claim 33, wherein the authorization of radio resources is according to a priority to access the radio resources.

39. The method of claim 24, wherein the user equipment comprises a transceiver for transmitting and receiving wireless data and a processing circuit coupled to the transceiver for performing the steps of claim 24.

40. A resource management method for device to device (D2D) communications in a network, adapted for a user equipment (UE), and the method comprising:
- transmitting to a first target a request to communicate in a D2D mode;
- performing a validation with the first target according to a geographical zone in which the user equipment is located in response to the request to communicate in the D2D mode, wherein the geographical zone is formed by at least three control nodes;
- receiving a notification from the first target whether the user equipment may communicate in the D2D mode in response to performing the validation with the first target; and
- receiving authorization of radio resources from a spectrum owner of the network to communicate in the D2D mode,
- wherein the authorization of radio resources is according to a priority to access the radio resources,
- wherein if the priority to access the radio resources is higher, the user equipment would have a shorter backoff window than another device with the lower priority to access the radio resources than the user equipment.

41. A resource management method for device to device (D2D) communications in a network, adapted for a user equipment (UE), and the method comprising:
- transmitting to a first target a request to communicate in a D2D mode;
- performing a validation with the first target according to a geographical zone in which the user equipment is located in response to the request to communicate in the D2D mode, wherein the geographical zone is formed by at least three control nodes;
- receiving a notification from the first target whether the user equipment may communicate in the D2D mode in response to performing the validation with the first target; and
- receiving authorization of radio resources from a spectrum owner of the network to communicate in the D2D mode,
- wherein the authorization of radio resources is according to a priority to access the radio resources,
- wherein if the priority to access the radio resources is higher, the user equipment would have more contention slots than another user equipment with the lower priority to access the radio resources than the user equipment.

42. A resource management method for device to device (D2D) communications in a network, adapted for a user equipment (UE), and the method comprising:
- transmitting to a first target a request to communicate in a D2D mode;
- performing a validation with the first target according to a geographical zone in which the user equipment is located in response to the request to communicate in the D2D mode, wherein the geographical zone is formed by at least three control nodes;
- receiving a notification from the first target whether the user equipment may communicate in the D2D mode in response to performing the validation with the first target; and
- receiving authorization of radio resources from a spectrum owner of the network to communicate in the D2D mode,
- wherein the authorization of radio resources is according to a priority to access the radio resources,
- wherein if the priority to access the radio resources is higher, the user equipment would have higher maximum transmission power than another user equipment with the lower priority to access the radio resources than the user equipment.

43. A resource management method for device to device (D2D) communications in a network, adapted for a user equipment (UE), and the method comprising:
- transmitting to a first target a request to communicate in a D2D mode;
- performing a validation with the first target according to a geographical zone in which the user equipment is located in response to the request to communicate in the D2D mode, wherein the geographical zone is formed by at least three control nodes;
- receiving a notification from the first target whether the user equipment may communicate in the D2D mode in response to performing the validation with the first target; and
- receiving authorization of radio resources from a spectrum owner of the network to communicate in the D2D mode,
- wherein the authorization of radio resources is according to a priority to access the radio resources,
- wherein if the priority to access the radio resources is higher, the user equipment would be assigned a higher priority identity than another user equipment with the lower priority to access the radio resources than the user equipment.

44. A resource management method for device to device (D2D) communications in a network, adapted for a user equipment (UE), and the method comprising:
- transmitting to a first target a request to communicate in a D2D mode;
- performing a validation with the first target according to a geographical zone in which the user equipment is located in response to the request to communicate in the D2D mode, wherein the geographical zone is formed by at least three control nodes;
- receiving a notification from the first target whether the user equipment may communicate in the D2D mode in response to performing the validation with the first target; and
- receiving authorization of radio resources from a spectrum owner of the network to communicate in the D2D mode,
- wherein if the user equipment is mobile, the first target would assign the user equipment with a temporary identity to access the radio resources to communicate in the D2D mode.

45. A resource management method for device to device (D2D) communications in a network, adapted for a user equipment (UE), and the method comprising:
- transmitting to a first target a request to communicate in a D2D mode;
- performing a validation with the first target according to a geographical zone in which the user equipment is located in response to the request to communicate in the D2D mode, wherein the geographical zone is formed by at least three control nodes;

receiving a notification from the first target whether the user equipment may communicate in the D2D mode in response to performing the validation with the first target;

receiving authorization of radio resources from a spectrum owner of the network to communicate in the D2D mode; and receiving authorization from a server, wherein if the user equipment is non-mobile, the first target would assign the user equipment with a fixed identity to access the radio resources to communicate in the D2D mode, wherein the fixed identity is more expensive than the temporary identity.

* * * * *